United States Patent
Iwai et al.

(10) Patent No.: US 7,833,689 B2
(45) Date of Patent: Nov. 16, 2010

(54) LITHOGRAPHIC PRINTING PLATE PRECURSOR AND LITHOGRAPHIC PRINTING METHOD

(75) Inventors: Yu Iwai, Shizuoka (JP); Hideakzu Oohashi, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 79 days.

(21) Appl. No.: 11/527,615

(22) Filed: Sep. 27, 2006

(65) Prior Publication Data

US 2007/0072119 A1 Mar. 29, 2007

(30) Foreign Application Priority Data

Sep. 27, 2005 (JP) ............................ P2005-280192
Sep. 27, 2005 (JP) ............................ P2005-280242

(51) Int. Cl.
*G03F 7/004* (2006.01)
*G03F 7/09* (2006.01)
*B41N 1/08* (2006.01)

(52) U.S. Cl. .................... 430/270.1; 430/302; 430/944; 101/456; 101/450.1

(58) Field of Classification Search .............. 430/270.1, 430/302, 300, 270.18, 270.2, 271.1, 944
See application file for complete search history.

(56) References Cited

U.S. PATENT DOCUMENTS 3,646,017 A * 2/1972 Hoffstadt ....................... 540/1
5,677,098 A * 10/1997 Nakayama et al. ............. 430/95
2002/0058156 A1* 5/2002 Toguchi et al. ............... 428/690
2004/0175649 A1 9/2004 Nakamura
2004/0197701 A1* 10/2004 Mitsumoto et al. ........ 430/270.1
2004/0229156 A1 11/2004 Nakamura et al.
2005/0142483 A1* 6/2005 Yamasaki ................. 430/270.1
2005/0202343 A1* 9/2005 Fujimaki .................. 430/270.1
2006/0049750 A1* 3/2006 Shirota et al. ................ 313/504
2006/0269874 A1* 11/2006 Huang et al. ................. 430/302
2006/0286483 A1* 12/2006 Yano et al. ............. 430/270.21

FOREIGN PATENT DOCUMENTS

| EP | 1440797 A2 | 7/2004 |
| EP | 1577113 A2 | 9/2005 |
| JP | 11-277927 A | 10/1999 |
| JP | 2000-335129 A | 12/2000 |
| JP | 2003-191657 | 7/2003 |
| WO | WO 2005/014722 | * 2/2005 |

* cited by examiner

*Primary Examiner*—Cynthia H Kelly
*Assistant Examiner*—Anca Eoff
(74) *Attorney, Agent, or Firm*—Birch, Stewart, Kolasch & Birch, LLP

(57) ABSTRACT

A lithographic printing plate precursor comprising a support and an image-recording layer containing at least one infrared absorbing agent of a cyanine dye in which a HOMO energy level of each of substituents present on both terminal nitrogen atoms is −10.0 eV or higher.

9 Claims, No Drawings

LITHOGRAPHIC PRINTING PLATE PRECURSOR AND LITHOGRAPHIC PRINTING METHOD

FIELD OF THE INVENTION

The present invention relates to a lithographic printing plate precursor and a lithographic printing method using the same. More specifically, it relates to a lithographic printing plate precursor capable of undergoing a so-called direct plate-making, which can be directly plate-made by scanning of laser having, for example, a wavelength of 300 to 1,200 nm, based on digital signals, for example, from a computer, and a lithographic printing method wherein the above-described lithographic printing plate precursor is directly developed on a printing machine to conduct printing without undergoing a development processing step.

BACKGROUND OF THE INVENTION

In general, a lithographic printing plate is composed of an oleophilic image area accepting ink and a hydrophilic non-image area accepting dampening water in the process of printing. Lithographic printing is a printing method which comprises rendering the oleophilic image area of the lithographic printing plate to an ink-receptive area and the hydrophilic non-image area thereof to a dampening water-receptive area (ink unreceptive area), thereby making a difference in adherence of ink on the surface of the lithographic printing plate, and depositing the ink only to the image area by utilizing the nature of the dampening water and oily ink to repel with each other, and then transferring the ink to a printing material, for example, paper.

In order to produce the lithographic printing plate, a lithographic printing plate precursor (PS plate) comprising a hydrophilic support having provided thereon an oleophilic photosensitive resin layer (image-recording layer) has heretofore been broadly used. Ordinarily, the lithographic printing plate is obtained by conducting plate making according to a method of exposing the lithographic printing plate precursor through an original, for example, a lith film, and then while leaving the image-recording layer to form the image area and removing other unnecessary image-recording layer by dissolving with an alkaline developer or an organic solvent thereby revealing the hydrophilic surface of support.

In the hitherto known plate-making process of lithographic printing plate precursor, after exposure, the step of removing the unnecessary image-recording layer by dissolving, for example, with a developer is required. However, it is one of the subjects to save or simplify such an additional wet treatment described above. Particularly, since disposal of liquid wastes discharged accompanying the wet treatment has become a great concern throughout the field of industry in view of the consideration for global environment in recent years, the demand for the solution of the above-described subject has been increased more and more.

As one of simple plate-making methods in response to the above-described requirement, it has been proposed a method referred to as on-machine development wherein a lithographic printing plate precursor having an image-recording layer the unnecessary portion of which is capable of being removed in a conventional printing process is used and after exposure, and the unnecessary portion of the image-recording layer is removed on a printing machine to prepare a lithographic printing plate.

Specific methods of the on-machine development include, for example, a method of using a lithographic printing plate precursor having an image-recording layer that can be dissolved or dispersed in dampening water, an ink solvent or an emulsion of dampening water and ink, a method of mechanically removing an image-recording layer by contact with rollers or a blanket cylinder of a printing machine, and a method of lowering cohesion of an image-recording layer or adhesion between an image-recording layer and a support upon penetration of dampening water, ink solvent or the like and then mechanically removing the image-recording layer by contact with rollers or a blanket cylinder of a printing machine.

In the invention, unless otherwise indicated particularly, the term "development processing step" means a step of using an apparatus (ordinarily, an automatic developing machine) other than a printing machine and removing an infrared laser-unexposed area of the image-recording layer of the lithographic printing plate precursor upon contact with liquid (ordinarily, an alkaline developer) thereby revealing a hydrophilic surface of support. The term "on-machine development" means a method and a step of removing an infrared laser-unexposed area of the image-recording layer of the lithographic printing plate precursor upon contact with liquid (ordinarily, printing ink and/or dampening water) by using a printing machine thereby revealing a hydrophilic surface of support.

On the other hand, digitalized technique of electronically processing, accumulating and outputting image information using a computer has been popularized in recent years, and various new image outputting systems responding to the digitalized technique have been put into practical use. Correspondingly, attention has been drawn to a computer-to-plate (CTP) technique of carrying digitalized image information on highly converging radiation, for example, laser light and conducting scanning exposure of a lithographic printing plate precursor to the light thereby directly preparing a lithographic printing plate without using a lith film. Thus, it is one of important technical subjects to obtain a lithographic printing plate precursor adaptable to the technique described above.

As described above, in recent years, the simplification of plate-making operation and the realization of dry system and non-processing system have been further strongly required from both aspects of the consideration for global environment and the adaptation for digitization.

In general, an operation for inspection and discrimination of image formed on a printing plate is carried out in order to examine whether the image is recorded on the printing plate as intended, in advance of mounting the printing plate on a printing machine. In a conventional lithographic printing plate precursor subjected to the development processing step, it is ordinarily easily performed to confirm the image formed after the plate-making (after the development processing) and before the printing (before the mounting the printing plate on a printing machine) by means of coloration of the image-recording layer.

However, with respect to the lithographic printing plate precursor of the on-machine development type or non-processing (non-development) type without accompanying the development processing prior to printing, the image is not recognized on the printing plate in the step of mounting it on a printing machine, and thus the discrimination of the printing plate can not be performed. In particular, it is important in the printing operation to determine whether a register mark which acts as a landmark for the registering in multicolor printing is recorded. Therefore, in the lithographic printing plate precursor of the on-machine development type or non-processing (non-development) type, a means for confirming the image (print-out agent) at the stage of exposure or heating is required.

Printing plates have been proposed wherein a compound capable of generating an acid, base or radical by means of light or heat and a compound capable of undergoing color change upon interaction with the acid, base or radical generated are used as the print-out agent (for example, see JP-A-11-277927 (the term "JP-A" as used herein means an "unexamined published Japanese patent application")). Also, it has been proposed to utilize color change of thermally decomposable compound as the print-out agent of a direct-drawing type lithographic printing plate precursor having a heat-sensitive layer (for example, see JP-A-2000-335129). Further, it has been proposed to use a thermally decomposable dye having a decomposable temperature of 250° C. or below as the print-out agent (for example, see JP-A-2003-191657).

SUMMARY OF THE INVENTION

An object of the present invention is to provide a lithographic printing plate precursor capable of forming a print-out image having good visibility so that the discrimination of printing plate can be easily performed at the stage of imagewise exposure with a laser or heating. Another of the invention is to provide a lithographic printing plate precursor of the on-machine development type or non-processing (non-development) type capable of forming a print-out image having good visibility so that the discrimination of printing plate can be easily performed at the stage of imagewise exposure with a laser or heating. A further object of the invention is to provide a lithographic printing method using the lithographic printing plate precursor of the on-machine development type. A still further object of the invention is to provide an infrared absorbing agent capable of forming a print-out image having good visibility so that the discrimination of printing plate can be easily performed at the stage of imagewise exposure with a laser or heating.

As a result of various investigations to achieve the above-described objects, the inventors have found that a print-out image having good visibility can be obtained by using a specific infrared absorbing agent together with a radical initiator to complete the invention.

Specifically, the present invention includes the following items.

1. A lithographic printing plate precursor comprising a support and an image-recording layer containing (1) at least one infrared absorbing agent of a cyanine dye in which a HOMO energy level of each of substituents present on both terminal nitrogen atoms is −10.0 eV or higher.

2. The lithographic printing plate precursor as described in item 1 above, wherein the infrared absorbing agent of a cyanine dye is represented by the following formula (I):

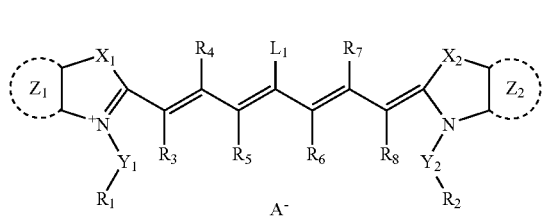

(I)

In formula (I), $L_1$ represents a hydrogen atom, a halogen atom, —$NPh_2$ or —$Y_3$-$L_2$; $Y_3$ represents an oxygen atom, a nitrogen atom or a sulfur atom; $L_2$ represents an alkyl group, an aryl group, a hetero aromatic group in which the hetero atom is selected from a nitrogen atom, a sulfur atom, an oxygen atom, a halogen atom and a selenium atom or a hydrocarbon group having from 1 to 12 carbon atoms and including a hetero atom selected from a nitrogen atom, a sulfur atom, an oxygen atom, a halogen atom and a selenium atom; $X_1$ and $X_2$ each independently represents a sulfur atom, an oxygen atom or a dialkylmethylene group having 12 or less carbon atoms; $Y_1$ and $Y_2$ each independently represents an organic connecting group, which may have a substituent, having 1 or more atoms and containing a carbon atom, or a single bond; $Z^1$ and $Z^2$ each independently represents an aromatic ring which may have a substituent or a hetero aromatic ring which may have a substituent; $R_1$ and $R_2$ each independently represents an organic functional group which meets a requirement that a HOMO energy level of $R_n$—$Y_n$—H (wherein n is 1 or 2) is −10.0 eV or more; $R_3$, $R_4$, $R_7$ and $R_8$ each independently represents a hydrogen atom or a hydrocarbon group having 12 or less carbon atoms; $R_5$ and $R_6$ each independently represents a hydrocarbon group, or $R_5$ and $R_6$ may be connected with each other to form a 5-membered or 6-membered ring; and $A^-$ represents a counter ion which exists in case of being necessary for neutralizing a charge.

3. The lithographic printing plate precursor as described in item 1 above, wherein the infrared absorbing agent of a cyanine dye is represented by the following formula (II):

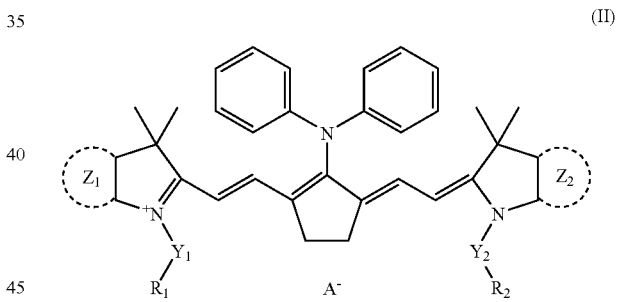

(II)

In formula (II), $Y_1$ and $Y_2$ each independently represents an organic connecting group, which may have a substituent, having 1 or more atoms and containing a carbon atom, or a single bond; $Z_1$ and $Z_2$ each independently represents an aromatic ring which may have a substituent or a hetero aromatic ring which may have a substituent; $R^1$ and $R_2$ each independently represents an organic functional group which meets a requirement that a HOMO energy level of $R_n$—$Y_n$—H (wherein n is 1 or 2) is −10.0 eV or more; and $A^-$ represents a counter ion which exists in case of being necessary for neutralizing a charge.

4. A lithographic printing plate precursor comprising a support and an image-recording layer containing (1) at least one infrared absorbing agent of a cyanine dye in which substituents present on both terminal nitrogen atoms are sterically hindered groups.

5. The lithographic printing plate precursor as described in item 4 above, wherein the infrared absorbing agent of a cyanine dye is represented by the following formula (III):

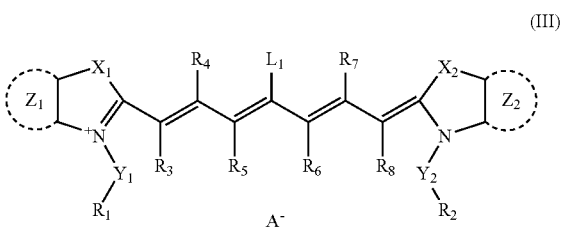

(III)

In formula (III), $L_1$ represents a hydrogen atom, a halogen atom, —$NPh_2$ or —$Y_3$-$L_2$; $Y_3$ represents an oxygen atom, a nitrogen atom or a sulfur atom; $L_2$ represents an alkyl group, an aryl group, a hetero aromatic group in which the hetero atom is selected from a nitrogen atom, a sulfur atom, an oxygen atom, a halogen atom and a selenium atom or a hydrocarbon group having from 1 to 12 carbon atoms and including a hetero atom selected from a nitrogen atom, a sulfur atom, an oxygen atom, a halogen atom and a selenium atom; $X_1$ and $X_2$ each independently represents a sulfur atom, an oxygen atom or a dialkylmethylene group having 12 or less carbon atoms; $Y_1$ and $Y_2$ each independently represents an organic connecting group, which may have a substituent, having 1 or more atoms and containing a carbon atom, or a single bond; $Z_1$ and $Z_2$ each independently represents an aromatic ring which may have a substituent or a hetero aromatic ring which may have a substituent; $R_1$ and $R_2$ each independently represents a tertiary alkyl group, a secondary alkyl group, a dialkylamino group, a diarylamino group, an aryl group which may have a substituent or a hetero aromatic group which may have a substituent; $R_3$, $R_4$, $R_7$ and $R_8$ each independently represents a hydrogen atom or a hydrocarbon group having 12 or less carbon atoms; $R_5$ and $R_6$ each independently represents a hydrocarbon group, or $R_5$ and $R_6$ may be connected with each other to form a 5-membered or 6-membered ring; and $A^-$ represents an anion which exists in case of being necessary for neutralizing a charge.

6. The lithographic printing plate precursor as described in item 4 above, wherein the infrared absorbing agent of a cyanine dye is represented by the following formula (IV):

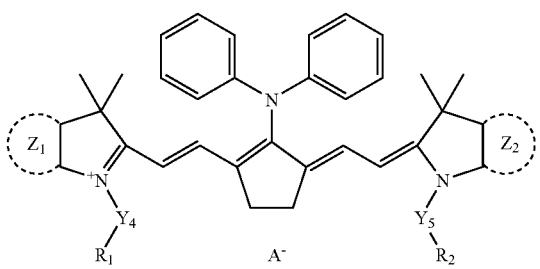

(IV)

In formula (IV), $Y_4$ and $Y_5$ each independently represents an organic connecting group having 1 or 2 atoms or a single bond; $Z_1$ and $Z_2$ each independently represents an aromatic ring which may have a substituent or a hetero aromatic ring which may have a substituent; $R_1$ and $R_2$ each independently represents a tertiary alkyl group, a secondary alkyl group, a dialkylamino group, a diarylamino group an aryl group which may have a substituent or a hetero aromatic group which may have a substituent; and $A^-$ represents an anion which exists in case of being necessary for neutralizing a charge.

7. The lithographic printing plate precursor as described in any one of items 1 to 6 above, wherein the image-recording layer further contains (2) a polymerization initiator, (3) a polymerizable compound and (4) a binder polymer.

8. The lithographic printing plate precursor as described in any one of items 1 to 7 above, wherein the image-recording layer further contains (5) a microcapsule.

9. The lithographic printing plate precursor as described in any one of items 1 to 8 above, which has an image-recording layer that can be image-recorded with infrared laser exposure and is capable of performing printing by conducting image-recording and then mounting on a printing machine without carrying out a development processing step or by conducting mounting on a printing machine and then image-recording.

10. A lithographic printing method comprising mounting the lithographic printing plate precursor as described in any one of items 1 to 9 above on a printing machine and exposing imagewise it with an infrared laser or exposing imagewise the lithographic printing plate precursor as described in any one of items 1 to 9 above with an infrared laser and mounting it on a printing machine, and thereafter conducting printing by supplying printing ink and dampening water on the exposed lithographic printing plate precursor to remove the unexposed area to the infrared laser in the image-recording layer.

11. An infrared absorbing agent of a cyanine dye represented by formula (V) shown below:

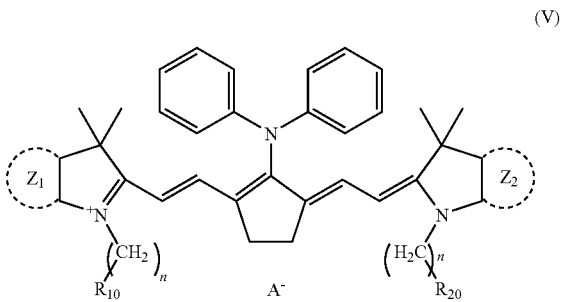

(V)

wherein $Z_1$ and $Z_2$ each independently represents an aromatic ring which may have a substituent or a hetero aromatic ring which may have a substituent; $R_{10}$ and $R_{20}$ each independently represents a phenyl group, a naphthyl group, an anthracenyl group, a carbazolyl group or a phenothiazinyl group each of which may have a substituent; $A^-$ represents an anion which exists in case of being necessary for neutralizing a charge and is selected from a halogen ion, a perchlorate ion, a tetrafluoroborate ion, a hexafluorophosphate ion and a sulfonate ion; and n represents 1 or 2.

According to the present invention, a lithographic printing plate precursor capable of forming a print-out image having good visibility so that the discrimination of printing plate can be easily performed at the stage of imagewise exposure with a laser or heating, particularly, a lithographic printing plate precursor of the on-machine development type or non-processing (non-development) type can be provided. Also, according to the invention, a lithographic printing method using the lithographic printing plate precursor of the on-machine development type can be provided. Further, according to the invention, an infrared absorbing agent capable of forming a print-out image having good visibility so that the discrimination of printing plate can be easily performed at the stage of imagewise exposure with a laser or heating can be provided.

DETAILED DESCRIPTION OF THE INVENTION

[Lithographic Printing Plate Precursor]

According to one embodiment (Embodiment 1) of the lithographic printing plate precursor of the invention, the lithographic printing plate precursor is characterized by comprising a support and (1) an image-recording layer containing at least one infrared absorbing agent of a cyanine dye in which a HOMO energy level of each of substituents present on both terminal nitrogen atoms is −10.0 eV or higher.

According to another embodiment (Embodiment 2) of the lithographic printing plate precursor of the invention, the lithographic printing plate precursor is characterized by comprising a support and an image-recording layer containing at least one infrared absorbing agent of a cyanine dye in which substituents present on the both terminal nitrogen atoms are sterically hindered groups. The sterically hindered group used herein is not particularly restricted as long as it can prevent a side reaction other than the intended structural change of the cyanine dye, and preferable examples of the sterically hindered group include a tertiary alkyl group, a secondary alkyl group, a dialkylamino group, a diarylamino group, an aryl group which may have a substituent or a hetero aromatic group which may have a substituent.

By having the image-recording layer, the lithographic printing plate precursor can provide a print-out image having good visibility after the image exposure with infrared ray irradiation. Therefore, from the standpoint of exert an effect of the print-out image having good visibility, the lithographic printing plate precursor according to the invention is preferably a lithographic printing plate precursor capable of performing printing by conducting image-recording and then mounting on a printing machine without carrying out a development processing step or by conducting mounting on a printing machine and then image-recording.

The lithographic printing plate precursor capable of performing printing by conducting image-recording and then mounting on a printing machine without carrying out a development processing step or by conducting mounting on a printing machine and then image-recording according to the invention includes (1) a lithographic printing plate precursor of the on-machine development type and a lithographic printing plate precursor of the non-processing (non-development) type. The lithographic printing plate precursor according to the invention is not particularly restricted as long as it is the lithographic printing plate precursor of (1) or (2).

(1) Lithographic Printing Plate Precursor of the on-Machine Development Type:

A lithographic printing plate precursor which has an image-recording layer whose solubility or dispersity in dampening water and/or ink changes upon exposure or whose adhesiveness to an adjacent layer having a different affinity to dampening water and/or ink changes upon exposure and is capable of being developed, after image exposure, by supplying dampening water and/or ink on the surface thereof on a printing machine.

(2) Lithographic Printing Plate Precursor of the Non-Processing (Non-Development) Type:

A lithographic printing plate precursor which has an image-recording layer whose surface affinity to dampening water and/or ink changes upon exposure and is capable of conducting printing, after image exposure, without accompanying with removal of the image-recording layer.

It is preferred that the lithographic printing plate precursor according to the invention contains in its image-recording layer (i) the infrared absorbing agent described above, (ii) a polymerization initiator, (iii) a polymerizable compound and (iv) a binder polymer, is capable of being recorded with infrared ray irradiation and is capable of performing printing by conducting image-recording and then mounting on a printing machine without carrying out a development processing step or by conducting mounting on a printing machine and then image-recording.

Each of the constituting elements and components of the lithographic printing plate precursor according to the invention will be described in greater detail below.

(Image-Recording Layer)

<Infrared Absorbing Agent>

The infrared absorbing agent is essential for exposing a lithographic printing plate precursor using a laser emitting an infrared ray of 760 to 1,200 nm as a light source to form an image. The infrared absorbing agent has a function of converting the infrared ray absorbed to heat and a function of being excited with the infrared ray and conducting electron transfer/energy transfer to a polymerization initiator (radical generator) described hereinafter. As the infrared absorbing agent for use in the invention, dyes or pigments having an absorption maximum in a wavelength range of 760 to 1,300 nm can be used individually or in combination of two or more thereof. According to Embodiment 1 of the lithographic printing plate precursor of the invention, the image-recording layer thereof contains at least one infrared absorbing agent of a cyanine dye in which a HOMO energy level of each of substituents present on both terminal nitrogen atoms is −10.0 eV or higher.

The substituent in which the HOMO energy level described above is −10.0 eV or higher includes, for example, a phenyl group (−9.7 eV), a phenethyl group (−9.3 eV), a 1-naphthylethyl group (−8.6 eV), a 9-anthracenylethyl group (−8.0 eV), an N-carbazolylethyl group (−8.2 eV) and an N-phenothiazinylethyl group (−7.2 eV), but the invention should not be construed as being limited thereto.

Specifically, the cyanine dye is preferably a dye represented by the following formula (I):

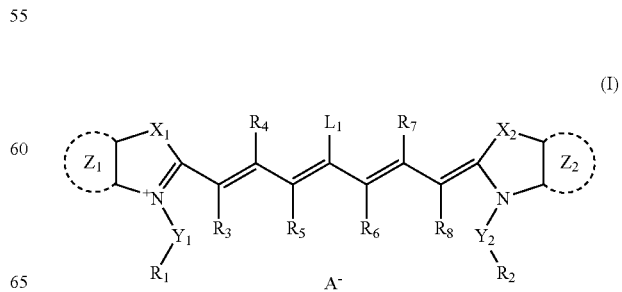

In formula (I), $L_1$ represents a hydrogen atom, a halogen atom, —$NPh_2$ or —$Y_3$-$L_2$; $Y_3$ represents an oxygen atom, a nitrogen atom or a sulfur atom; $L_2$ represents a hydrocarbon group having from 1 to 12 carbon atoms, an aromatic ring containing a hetero atom or a hydrocarbon group having from 1 to 12 carbon atoms and including a hetero atom. The hetero atom indicates a nitrogen atom, a sulfur atom, an oxygen atom, a halogen atom or a selenium atom. From the standpoint of providing a print-out image having good visibility, $L_1$ preferably represents —$NPh_2$. $Y_1$ and $Y_2$ each independently represents a single bond or an organic connecting group which has 1 or more atoms, contains a carbon atom and may have a substituent. From the standpoint of providing a print-out image having good visibility, $Y_1$ and $Y_2$ each preferably represents an organic connecting group having from 1 to 4 atoms or a single bond, and most preferably represents an organic connecting group having from 1 to 3 atoms. $Z^1$ and $Z^2$ each independently represents an aromatic ring which may have a substituent or a hetero aromatic ring which may have a substituent. Preferable examples of the aromatic ring include a benzene ring and a naphthalene ring. Also, preferable examples of the substituent include a hydrocarbon group having 12 or less carbon atoms, a halogen atom and an alkoxy group having 12 or less carbon atoms. $X_1$ and $X_2$ each independently represents a sulfur atom, an oxygen atom or a dialkylmethylene group having 12 or less carbon atoms. From the standpoint of providing a print-out image having good visibility, $X_1$ and $X_2$ each preferably represents a dialkylmethylene group having 12 or less carbon atoms.

$R_1$ and $R_2$ each independently represents an organic functional group which meets a requirement that a HOMO energy level of $R_n$—$Y_n$—H (wherein n is 1 or 2) is –10.0 eV or more. From the standpoint of providing a print-out image having good visibility, $R_1$ and $R_2$ each independently represents an organic functional group which meets a requirement that a HOMO energy level of $R_n$—$Y_n$—H (wherein n is 1 or 2) is –9.0 eV or more. Also, from the same standpoint, the organic functional group is most preferably an aryl group or hetero aromatic group having 20 or less carbon atoms, which may have a substituent. $R_3$, $R_4$, $R_7$ and $R_8$ each independently represents a hydrogen atom or a hydrocarbon group having 12 or less carbon atoms. In view of the availability of raw materials, a hydrogen atom is preferred. $R_5$ and $R_6$ each independently represents a hydrocarbon group, preferably a hydrocarbon group having from 1 to 12 carbon atoms. In view of the preservation stability of a coating solution for image-recording layer, it is preferred that $R_5$ and $R_6$ each represents a hydrocarbon group having two or more carbon atoms, and more preferably, $R_5$ and $R_6$ are combined with each other to form a 5-membered or 6-membered ring. Further, from the standpoint of providing a print-out image having good visibility, it is preferable that $R_5$ and $R_6$ are combined with each other to form a 5-membered ring. $A^-$ represents a counter anion. However, when the cyanine dye represented by formula (I) has an anionic substituent in its structure and it is not necessary for neutralizing a charge, $A^-$ is not required. Preferable examples of the counter anion for $A^-$ include a halogen ion, a perchlorate ion, a tetrafluoroborate ion, a hexafluorophosphate ion and a sulfonate ion, and particularly preferable examples thereof include a perchlorate ion, a hexafluorophosphate ion and a tetrafluoroborate ion in view of the preservation stability of a coating solution for image-recording layer.

The infrared absorbing agent more preferably used in the invention includes an infrared absorbing agent represented by the following formula (II):

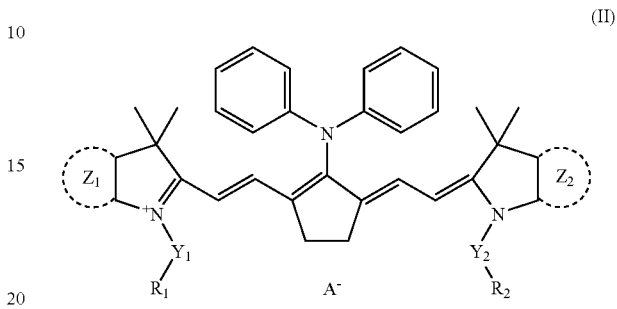

(II)

In formula (II), $Y_1$ and $Y_2$ each independently represents a single bond or an organic connecting group which has 1 or more atoms, contains a carbon atom and may have a substituent. $Z_1$, $Z_2$, $R_1$, $R_2$ and $A^-$ have the same meanings as those defined in formula (I) respectively.

Specific examples of the cyanine dye represented by formula (I) or (II) preferably used in the invention are set forth below, but the invention should not be construed as being limited thereto.

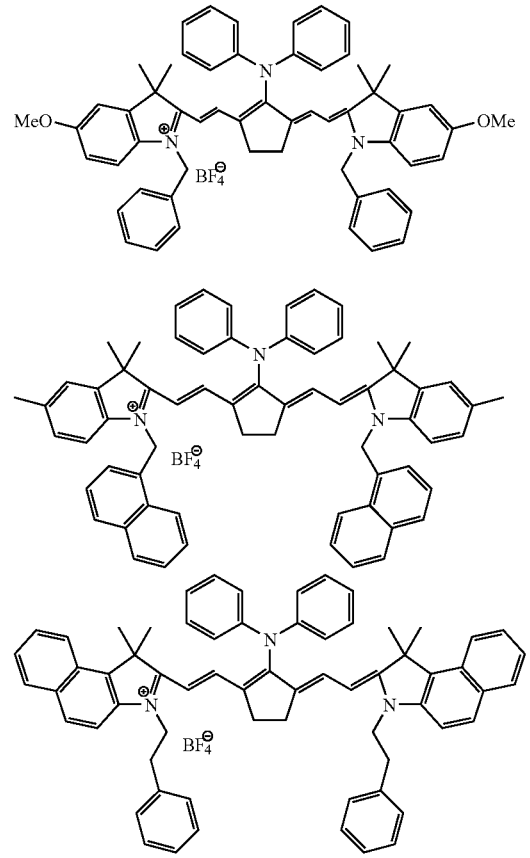

-continued
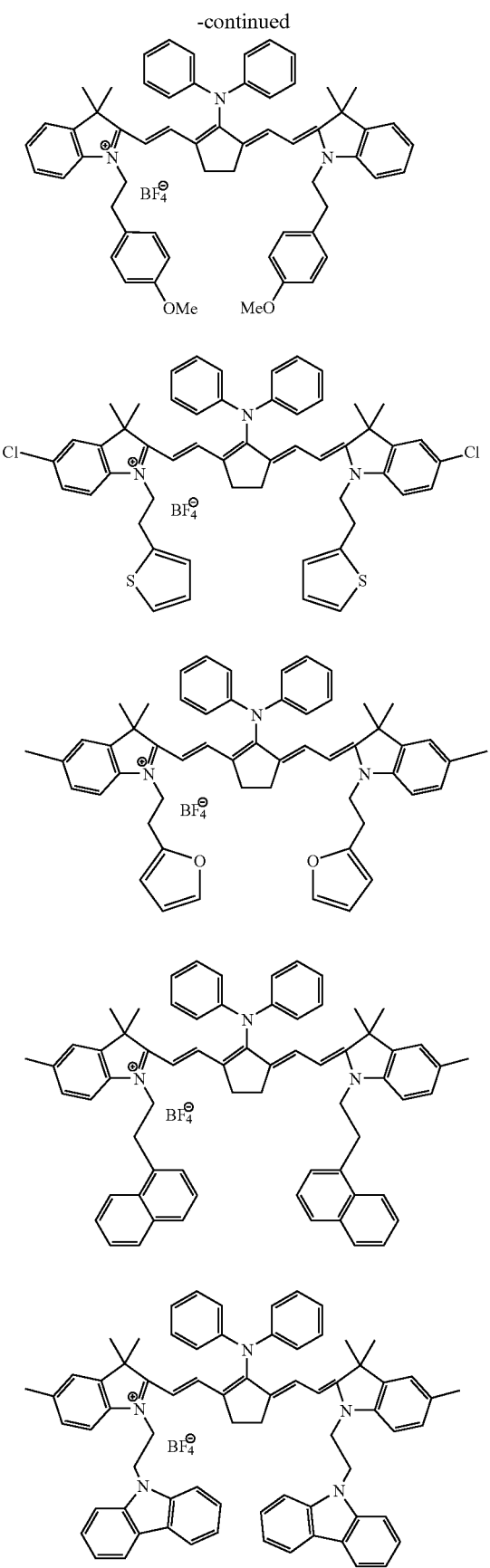
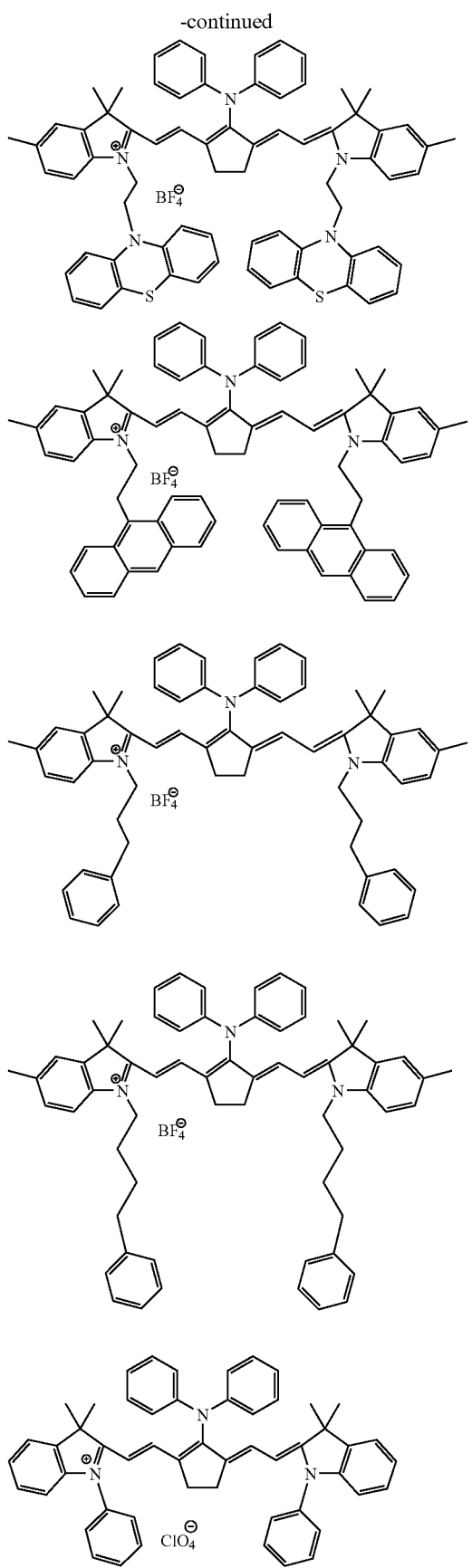

-continued

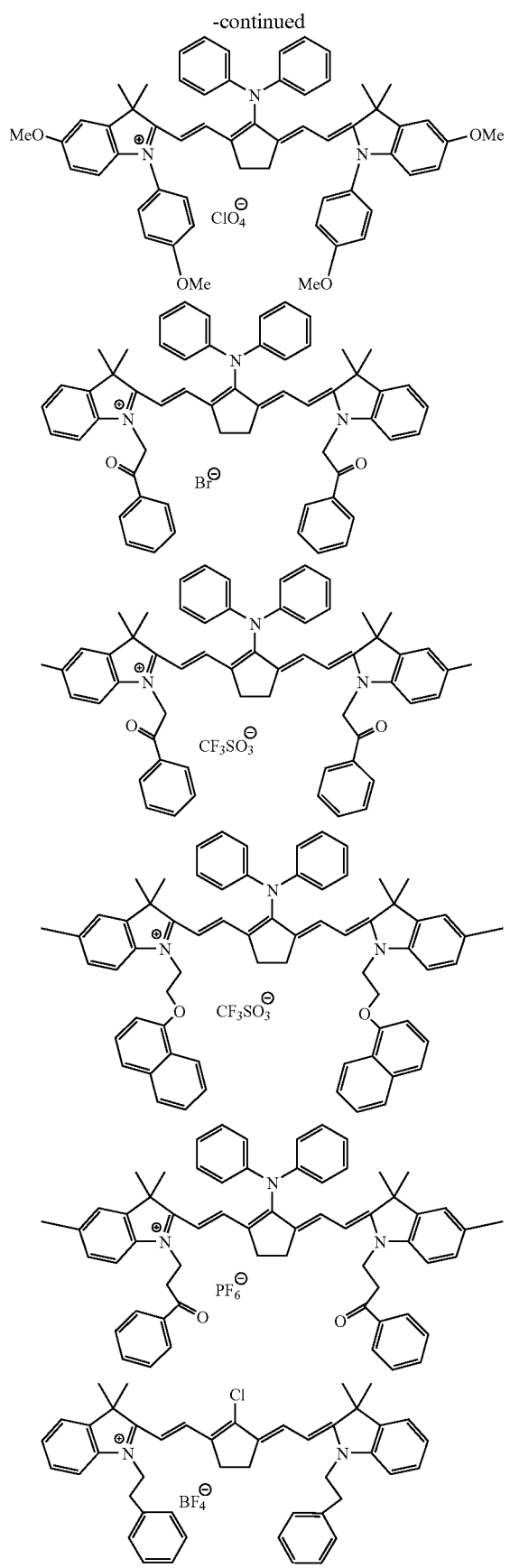

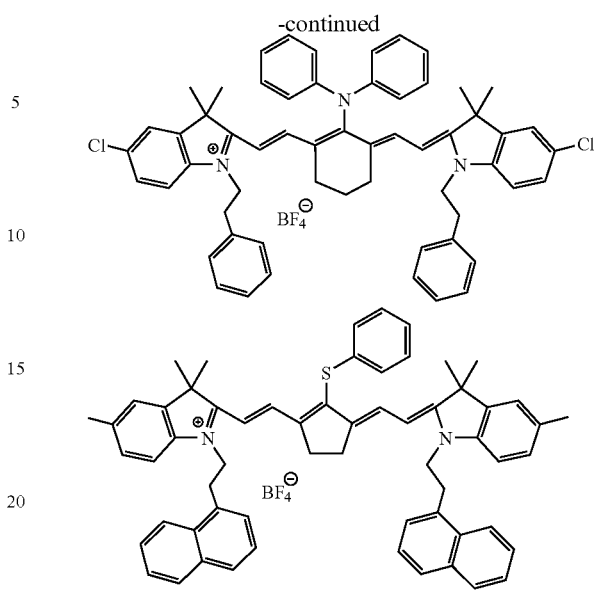

According to Embodiment 2 of the lithographic printing plate precursor of the invention, the image-recording layer thereof contains as an infrared absorbing agent, at least one cyanine dye in which substituents present on the both terminal nitrogen atoms are sterically hindered groups.

Specifically, the cyanine dye is preferably a dye represented by the following formula (III):

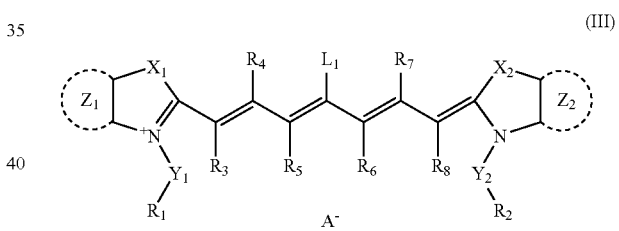

(III)

In formula (III), $L_1$ represents a hydrogen atom, a halogen atom, —$NPh_2$ or —$Y_3$-$L_2$. $Y_3$ represents an oxygen atom, a nitrogen atom or a sulfur atom, and $L_2$ represents an alkyl group, an aryl group, a hetero aromatic group in which the hetero atom is selected from a nitrogen atom, a sulfur atom, an oxygen atom, a halogen atom and a selenium atom or a hydrocarbon group having from 1 to 12 carbon atoms and including a hetero atom selected from a nitrogen atom, a sulfur atom, an oxygen atom, a halogen atom and a selenium atom. A number of the carbon atoms included in the alkyl group or aryl group is preferably 12 or less. From the standpoint of providing a print-out image having good visibility, $L_1$ preferably represents —$NPh_2$.

$X_1$ and $X_2$ each independently represents a sulfur atom, an oxygen atom or a dialkylmethylene group having 12 or less carbon atoms. From the standpoint of providing a print-out image having good visibility, $X_1$ and $X_2$ each preferably represents a dialkylmethylene group having 12 or less carbon atoms. $Y_1$ and $Y_2$ each independently represents a single bond or an organic connecting group which has 1 or more atoms, contains a carbon atom and may have a substituent. $Y_1$ and $Y_2$ each preferably represents an organic connecting group having 3 or less atoms including a carbon atom. $Z^1$ and $Z^2$ each independently represents an aromatic ring which may have a substituent or a hetero aromatic ring which may have a substituent. Preferable examples of the aromatic ring include a benzene ring and a naphthalene ring. Also, preferable examples of the substituent include a hydrocarbon group having 12 or less carbon atoms, a halogen atom and an alkoxy group having 12 or less carbon atoms.

$R_1$ and $R_2$ each independently represents a tertiary alkyl group, a secondary alkyl group, a dialkylamino group, a diarylamino group, an aryl group which may have a substituent or a hetero aromatic group which may have a substituent. $R_1$ and $R_2$ each preferably represents a tertiary alkyl group having 20 or less carbon atoms, a secondary alkyl group having 20 or less carbon atoms, a dialkylamino group having 16 or less carbon atoms, a diarylamino group having 20 or less carbon atoms, an aryl group having 20 or less carbon atoms which may have a substituent or a hetero aromatic group having 20 or less carbon atoms which may have a substituent. More preferably, $R^1$ and $R_2$ each represents a tertiary alkyl group having from 4 to 15 carbon atoms, a secondary alkyl group having from 4 to 15 carbon atoms or an aryl group or hetero aromatic group having 10 to 15 carbon atoms.

$R_3$, $R_4$, $R_7$ and $R_8$ each independently represents a hydrogen atom or a hydrocarbon group having 12 or less carbon atoms. In view of the availability of raw materials, a hydrogen atom is preferred. $R_5$ and $R_6$ each independently represents a hydrocarbon group, preferably a hydrocarbon group having from 1 to 12 carbon atoms. Alternatively, $R_5$ and $R_6$ may be combined with each other to form a 5-membered or 6-membered ring. In view of the preservation stability of a coating solution for image-recording layer, it is preferred that $R_5$ and $R_6$ each represents a hydrocarbon group having two or more carbon atoms, and more preferably, $R_5$ and $R_6$ are combined with each other to form a 5-membered or 6-membered ring. Further, from the standpoint of providing a print-out image having good visibility, it is preferable that $R_5$ and $R_6$ are combined with each other to form a 5-membered ring.

$A^-$ represents a counter anion. Preferable examples of the counter anion for $A^-$ include a halogen ion, a perchlorate ion, a tetrafluoroborate ion, a hexafluorophosphate ion and a sulfonate ion, and particularly preferable examples thereof include a perchlorate ion, a hexafluorophosphate ion and a tetrafluoroborate ion in view of the preservation stability of a coating solution for image-recording layer. However, when the cyanine dye represented by formula (III) has an anionic substituent in its structure and it is not necessary for neutralizing a charge, $A^-$ is not required.

Of the infrared absorbing agents including the sterically hindered groups, an infrared absorbing agent represented by formula (IV) shown below is more preferable.

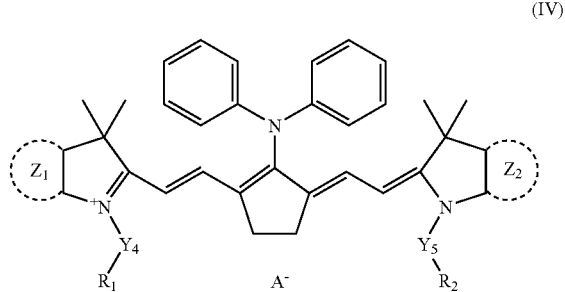

(IV)

In formula (IV), $Y_4$ and $Y_5$ each independently represents an organic connecting group having 1 or 2 atoms or a single bond. $Z_1$, $Z_2$, $R_1$, $R_2$ and $A^-$ have the same meanings as those defined in formula (III) respectively.

Specific examples of the cyanine dye represented by formula (III) or (IV) preferably used in the invention are set forth below, but the invention should not be construed as being limited thereto.

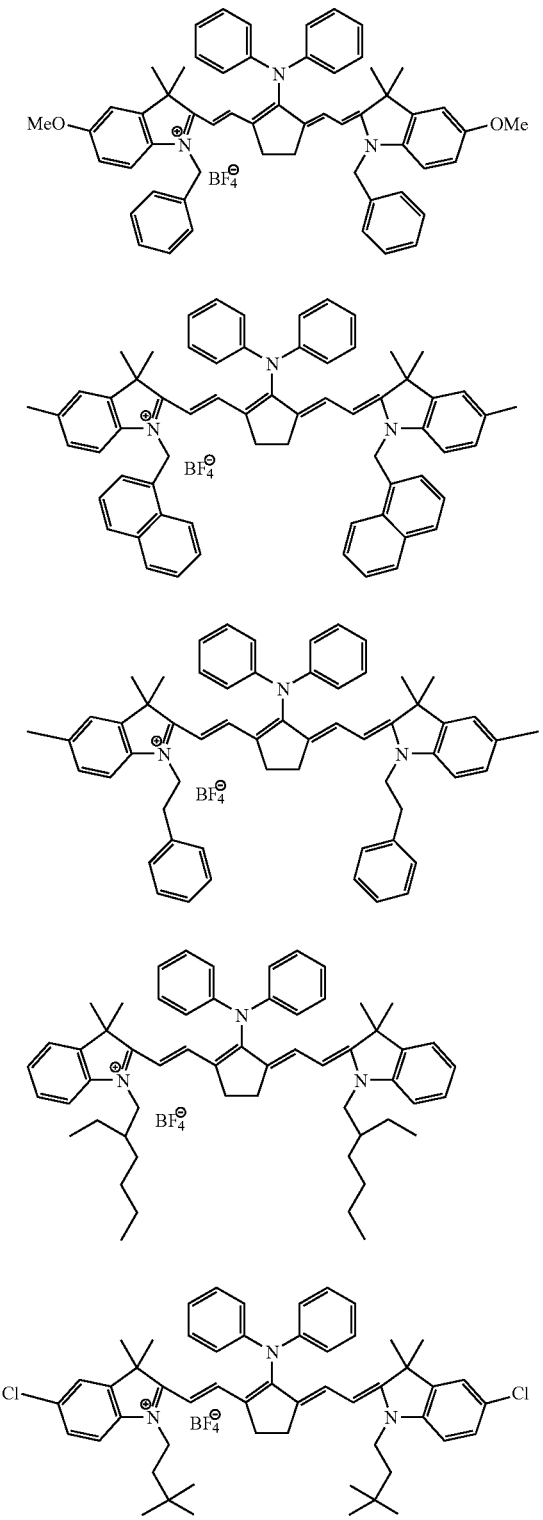

-continued
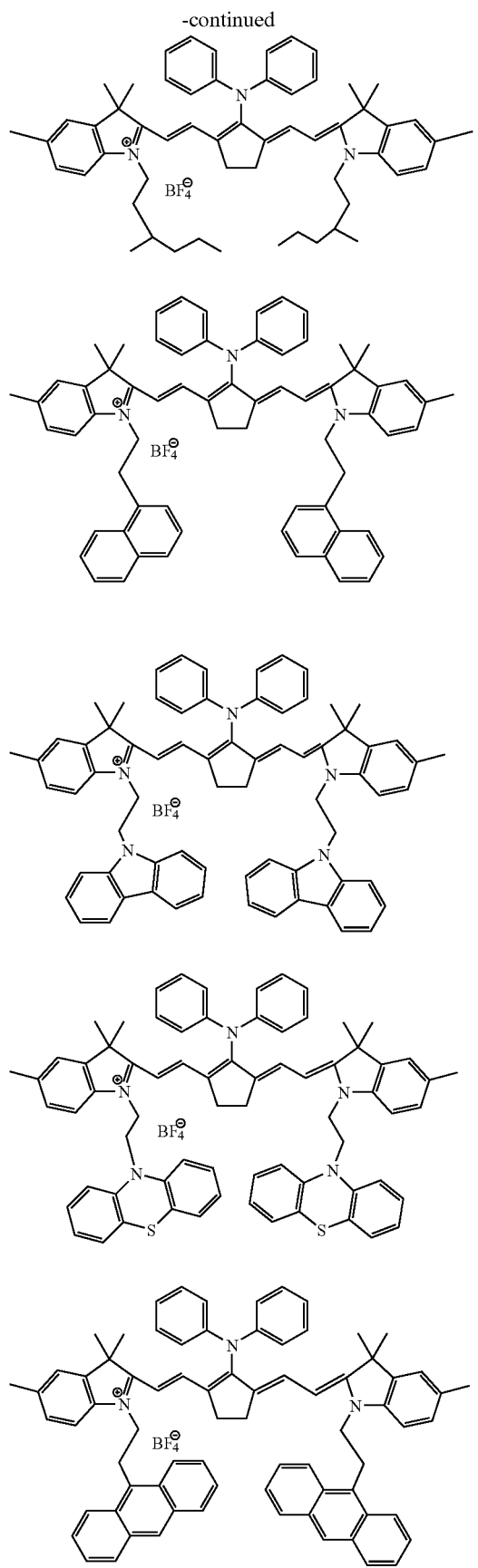
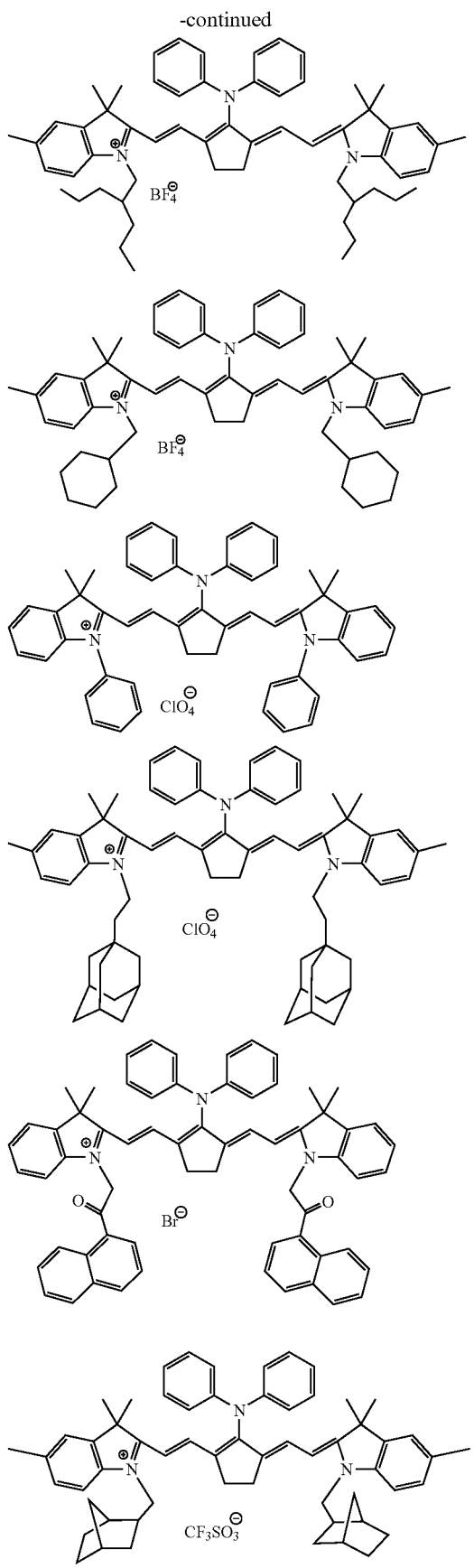

-continued

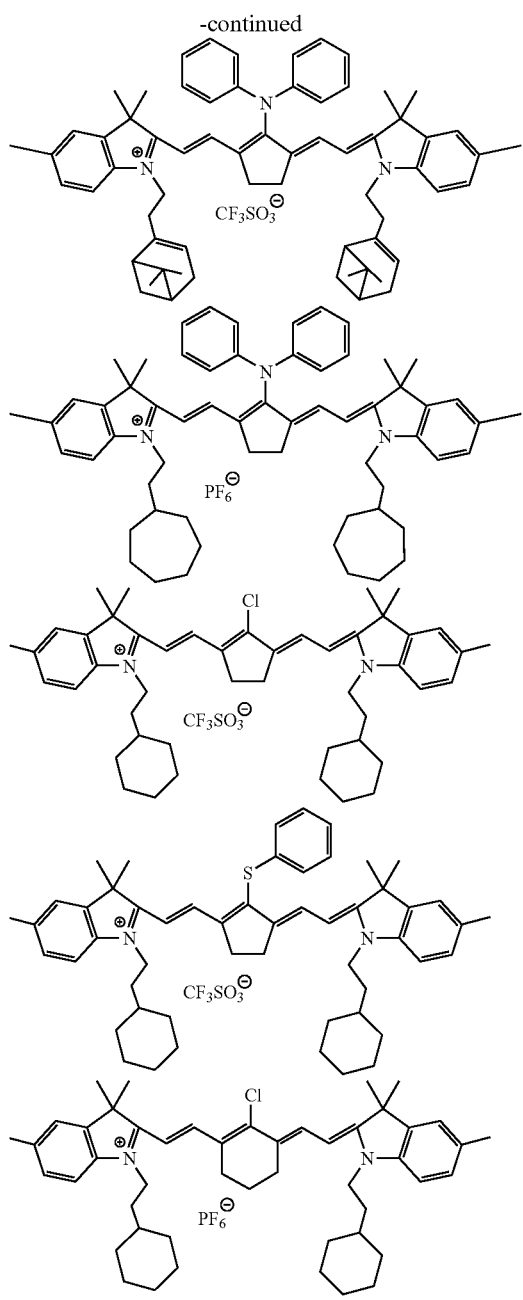

As the infrared absorbing agent according to the invention, a known dye or pigment having the absorption maximum in a wavelength range of 760 to 1,200 nm can be used in addition to the above-described cyanine dye.

As the dye, commercially available dyes and known dyes described in literature, for example, *Senryo Binran* (Dye Handbook) compiled by The Society of Synthetic Organic Chemistry, Japan (1970) may be used together. Specifically, the dyes include azo dyes, metal complex azo dyes, pyrazolone azo dyes, naphthoquinone dyes, anthraquinone dyes, phthalocyanine dyes, carbonium dyes, quinoneimine dyes, methine dyes, cyanine dyes, squarylium dyes, pyrylium salts and metal thiolate complexes.

Preferred examples of the dye include cyanine dyes described, for example, in JP-A-58-125246, JP-A-59-84356 and JP-A-60-78787; methine dyes described, for example, in JP-A-58-173696, JP-A-58-181690 and JP-A-58-194595; naphthoquinone dyes described, for example, in JP-A-58-112793, JP-A-58-224793, JP-A-59-48187, JP-A-59-73996, JP-A-60-52940 and JP-A-60-63744; squarylium dyes described, for example, in JP-A-58-112792; and cyanine dyes described, for example, in British Patent 434,875.

Also, near infrared absorbing sensitizers described in U.S. Pat. No. 5,156,938 are preferably used. Further, substituted arylbenzo(thio)pyrylium salts described in U.S. Pat. No. 3,881,924, trimethinethiapyrylium salts described in JP-A-57-142645 (U.S. Pat. No. 4,327,169), pyrylium compounds described in JP-A-58-181051, JP-A-58-220143, JP-A-59-41363, JP-A-59-84248, JP-A-59-84249, JP-A-59-146063 and JP-A-59-146061, cyanine dyes described in JP-A-59-216146, pentamethinethiopyrylium salts described in U.S. Pat. No. 4,283,475, and pyrylium compounds described in JP-B-5-13514 and JP-B-5-19702 (the term "JP-B" as used herein means an "examined Japanese patent publication") are also preferably used. Other preferred examples of the dye include near infrared absorbing dyes represented by formulae (I) and (II) in U.S. Pat. No. 4,756,993.

Other preferred examples of the infrared absorbing dye according to the invention include specific indolenine cyanine dyes described in JP-A-2002-278057 as illustrated below.

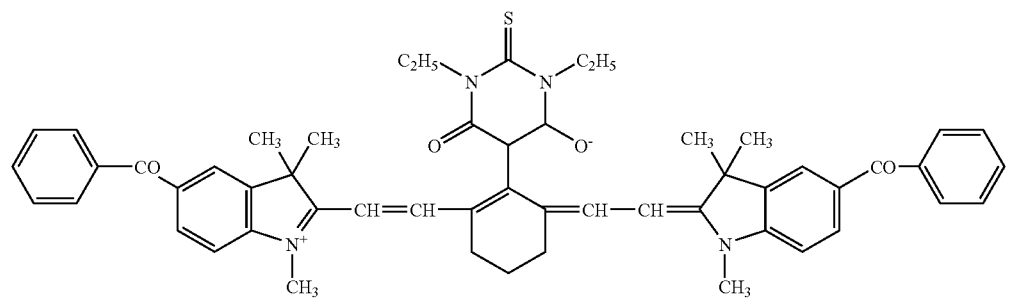

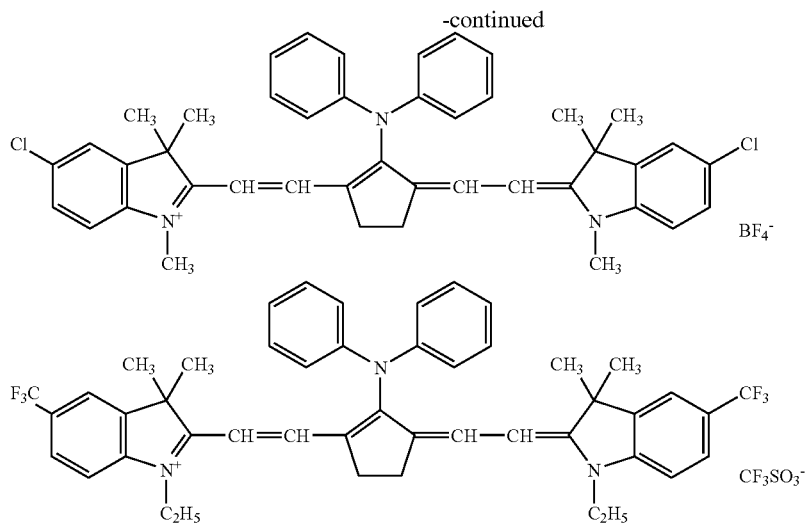

Of the dyes, cyanine dyes, squarylium dyes, pyrylium dyes, nickel thiolate complexes and indolenine cyanine dyes are particularly preferred. Cyanine dyes and indolenine cyanine dyes are more preferred. As one particularly preferable example of the dye, a cyanine dye represented by formula (i) shown below is exemplified.

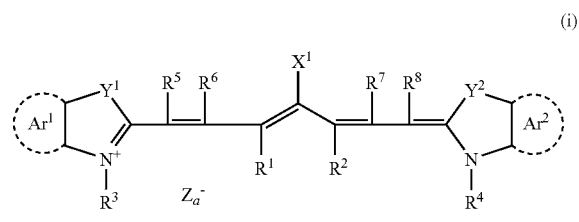

In formula (i), $X^1$ represents a hydrogen atom, a halogen atom, —$NPh_2$, $X^2$-$L^1$ or a group shown below.

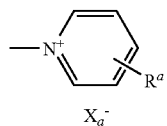

In the above, $X^2$ represents an oxygen atom, a nitrogen atom or a sulfur atom, and $L^1$ represents a hydrocarbon group having from 1 to 12 carbon atoms, an aromatic cyclic group containing a hetero atom or a hydrocarbon group having from 1 to 12 carbon atoms and including a hetero atom. The hetero atom means a nitrogen atom, a sulfur atom, an oxygen atom, a halogen atom or a selenium atom. $Xa^-$ has the same meaning as $Za^-$ defined hereinafter, and $R^a$ represents a hydrogen atom or a substituent selected from an alkyl group, an aryl group, a substituted or unsubstituted amino group and a halogen atom.

In formula (i), $R^1$ and $R^2$ each independently represents a hydrocarbon group having from 1 to 12 carbon atoms. In view of the preservation stability of a coating solution for image-recording layer, it is preferred that $R^1$ and $R^2$ each represents a hydrocarbon group having two or more carbon atoms, and particularly preferably, $R^1$ and $R^2$ are combined with each other to form a 5-membered or 6-membered ring.

In formula (i), $Ar^1$ and $Ar^2$, which may be the same or different, each represents an aromatic hydrocarbon group which may have a substituent. Preferred examples of the aromatic hydrocarbon group include a benzene ring and a naphthalene ring. Also, preferred examples of the substituent include a hydrocarbon group having 12 or less carbon atoms, a halogen atom and an alkoxy group having 12 or less carbon atoms. $Y^1$ and $Y^2$, which may be the same or different, each represents a sulfur atom or a dialkylmethylene group having 12 or less carbon atoms. $R^3$ and $R^4$ which may be the same or different, each represents a hydrocarbon group having 20 or less carbon atoms which may have a substituent. Preferred examples of the substituent include an alkoxy group having 12 or less carbon atoms, a carboxy group and a sulfo group. $R^5$, $R^6$, $R^7$ and $R^8$, which may be the same or different, each represents a hydrogen atom or a hydrocarbon group having 12 or less carbon atoms. From the standpoint of the availability of raw materials, a hydrogen atom is preferred. $Za^-$ represents a counter anion. However, $Za^-$ is not necessary when the cyanine dye represented by formula (i) has an anionic substituent in the structure thereof so that neutralization of charge is not required. Preferred examples of the counter anion for $Za^-$ include a halogen ion, a perchlorate ion, a tetrafluoroborate ion, a hexafluorophosphate ion and a sulfonate ion, and particularly preferred examples thereof include a perchlorate ion, a hexafluorophosphate ion and an arylsulfonate ion in view of the preservation stability of a coating solution for image-recording layer.

Specific examples of the cyanine dye represented by formula (i) which can be preferably used in the invention include those described in paragraphs [0017] to [0019] of JP-A-2001-133969.

Further, other particularly preferable examples include specific indolenine cyanine dyes described in JP-A-2002-278057 described above.

Examples of the infrared absorbing pigment used in the invention include commercially available pigments and pigments described in Colour Index (C.I.), *Saishin Ganryo Binran* (Handbook of Newest Pigments) compiled by Pigment Technology Society of Japan (1977), *Saishin Ganryo Oyou Gijutsu* (Newest Application Technologies of Pigments), CMC Publishing Co., Ltd. (1986) and *Insatsu Ink Gijutsu* (Printing Ink Technology), CMC Publishing Co., Ltd. (1984).

Examples of the pigment include black pigments, yellow pigments, orange pigments, brown pigments, red pigments, purple pigments, blue pigments, green pigments, fluorescent pigments, metal powder pigments and polymer-bonded dyes. Specific examples of usable pigments include insoluble azo pigments, azo lake pigments, condensed azo pigments, chelated azo pigments, phthalocyanine pigments, anthraquinone pigments, perylene and perynone pigments, thioindigo pigments, quinacridone pigments, dioxazine pigments, isoindolinone pigments, quinophthalone pigments, dying lake pigments, azine pigments, nitroso pigments, nitro pigments, natural pigments, fluorescent pigments, inorganic pigments and carbon black. Of the pigments, carbon black is preferred.

The pigment may be used without undergoing surface treatment or may be used after the surface treatment. For the surface treatment, a method of coating a resin or wax on the surface, a method of attaching a surfactant and a method of bonding a reactive substance (for example, a silane coupling agent, an epoxy compound or polyisocyanate) to the pigment surface. The surface treatment methods are described in *Kinzoku Sekken no Seishitsu to Oyou* (Properties and Applications of Metal Soap), Saiwai Shobo, *Insatsu Ink Gijutsu* (Printing Ink Technology), CMC Publishing Co., Ltd. (1984), and *Saishin Ganryo Oyou Gijutsu* (Newest Application Technologies of Pigments), CMC Publishing Co., Ltd. (1986).

The pigment has a particle size of preferably from 0.01 to 10 µm, more preferably from 0.05 to 1 µm, particularly preferably from 0.1 to 1 µm. In the above-described range, good stability of the pigment dispersion in a coating solution for image-recording layer and good uniformity of the image-recording layer can be achieved.

For dispersing the pigment, a known dispersion technique for use in the production of ink or toner may be used. Examples of the dispersing machine include an ultrasonic dispersing machine, a sand mill, an attritor, a pearl mill, a super-mill, a ball mill, an impeller, a disperser, a KD mill, a colloid mill, a dynatron, a three roll mill and a pressure kneader. The dispersing machines are described in detail in *Saishin Ganryo Oyou Gijutsu* (Newest Application Technologies of Pigments), CMC Publishing Co., Ltd. (1986).

In the present invention, the infrared absorbing agent may be added together with other components to one layer or may be added to a different layer separately provided. With respect to an amount of the infrared absorbing agent added, in the case of preparing a negative-working lithographic printing plate precursor, the amount is so controlled that absorbance of the image-recording layer at the maximum absorption wavelength in the wavelength region of from 760 to 1,200 nm measured by a reflection measurement method is ordinarily in a range from 0.3 to 1.2, preferably in a range from 0.4 to 1.1. In the above-described range, the polymerization reaction proceeds uniformly in the thickness direction of the image-recording layer and good film strength of the image area and good adhesion of the image area to a support are achieved.

The absorbance of the image-recording layer can be controlled depending on the amount of the infrared absorbing agent added to the image-recording layer and the thickness of the image-recording layer. The measurement of the absorbance can be carried out in a conventional manner. The method for measurement includes, for example, a method of forming a image-recording layer having a thickness as a coating amount after drying determined appropriately in the range necessary for the lithographic printing plate precursor on a reflective support, for example, an aluminum plate, and measuring reflection density of the image-recording layer by an optical densitometer or a spectrophotometer according to a reflection method using an integrating sphere.

<Polymerization Initiator>

The polymerization initiator for use in the invention is a compound that generates a radical with light energy, heat energy or both energies to initiate or accelerate polymerization of a compound having a polymerizable unsaturated group. The polymerization initiator for use in the invention includes, for example, known thermal polymerization initiators, compounds containing a bond having small bond dissociation energy and photopolymerization initiator. The compound generating a radical preferably used in the invention is a compound that generates a radical with heat energy to initiate or accelerate polymerization of a compound having a polymerizable unsaturated group. The thermal radical generator according to the invention is appropriately selected from known polymerization initiators and compounds containing a bond having small bond dissociation energy. The polymerization initiators can be used individually or in combination of two or more thereof.

The polymerization initiators include, for example, organic halogenated compounds, carbonyl compounds, organic peroxy compounds, azo compounds, azido compounds, metallocene compounds, hexaarylbiimidazole compounds, organic boric acid compounds, disulfonic acid compounds, oxime ester compounds and onium salt compounds.

The organic halogenated compounds specifically include, for example, compounds described in Wakabayashi et al., *Bull. Chem. Soc. Japan,* 42, 2924 (1969), U.S. Pat. No. 3,905, 815, JP-B-46-4605, JP-A-48-35281, JP-A-55-32070, JP-A-60-239736, JP-A-61-169835, JP-A-61-169837, JP-A-62-58241, JP-A-62-212401, JP-A-63-70243, JP-A-63-298339 and M. P. Hutt, *Journal of Heterocyclic Chemistry,* 1, No. 3 (1970). Particularly, oxazole compounds and s-triazine compounds each substituted with a trihalomethyl group are exemplified.

More preferably, s-triazine derivatives in which at least one of mono-, di- or tri-halogen substituted methyl group is connected to the s-triazine ring are exemplified. Specific examples thereof include
2,4,6-tris(monochloromethyl)-s-triazine, 2,4,6-tris(dichloromethyl)-s-triazine,
2,4,6-tris(trichloromethyl)-s-triazine,
2-methyl-4,6-bis(trichloromethyl)-s-triazine,
2-n-propyl-4,6-bis(trichloromethyl)-s-triazine,
2-(α,α,β-trichloroethyl)-4,6-bis(trichloromethyl)-s-triazine,
2-phenyl-4,6-bis(trichloromethyl)-s-triazine,
2-(p-methoxyphenyl)-4,6-bis(trichloromethyl)-s-triazine,
2-(3,4-epoxyphenyl)-4,6-bis(trichloromethyl)-s-triazine,
2-(p-chlorophenyl)-4,6-bis(trichloromethyl)-s-triazine,
2-[1-(p-methoxyphenyl)-2,4-butadienyl]-4,6-bis(trichloromethyl)-s-triazine,
2-styryl-4,6-bis(trichloromethyl)-s-triazine,
2-(p-methoxystyryl)-4,6-bis(trichloromethyl)-s-triazine,
2-(p-isopropyloxystyryl)-4,6-bis(trichloromethyl)-s-triazine,
2-(p-tolyl)-4,6-bis(trichloromethyl)-s-triazine,
2-(4-methoxynaphthyl)-4,6-bis(trichloromethyl)-s-triazine,
2-phenylthio-4,6-bis(trichloromethyl)-s-triazine,
2-benzylthio-4,6-bis(trichloromethyl)-s-triazine,
2,4,6-tris(dibromomethyl)-s-triazine, 2,4,6-tris(tribromomethyl)-s-triazine,
2-methyl-4,6-bis(tribromomethyl)-s-triazine and
2-methoxy-4,6-bis(tribromomethyl)-s-triazine.

The carbonyl compounds described above include, for example, benzophenone derivatives, e.g., benzophenone, Michler's ketone, 2-methylbenzophenone, 3-methylbenzophenone, 4-methylbenzophenone, 2-chlorobenzophenone, 4-bromobenzophenone or 2-carboxybenzophenone, acetophenone derivatives, e.g., 2,2-dimethoxy-2-phenylacetophenone, 2,2-diethoxyacetophenone, 1-hydroxycyclohexylphenylketone, α-hydroxy-2-methylphenylpropane, 1-hydroxy-1-methylethyl-(p-isopropylphenyl)ketone, 1-hydroxy-1-(p-dodecylphenyl)ketone, 2-methyl-(4'-(methylthio)phenyl)-2-morpholino-1-propane or 1,1,1-trichloromethyl-(p-butylphenyl)ketone, thioxantone derivatives, e.g., thioxantone, 2-ethylthioxantone, 2-isopropylthioxantone, 2-chlorothioxantone, 2,4-dimetylthioxantone, 2,4-dietylthioxantone or 2,4-diisopropylthioxantone, and benzoic acid ester derivatives, e.g., ethyl p-dimethylaminobenzoate or ethyl p-diethylaminobenzoate.

The azo compounds described above include, for example, azo compounds described in JP-A-8-108621.

The organic peroxy compounds described above include, for example, trimethylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis(tert-butylperoxy)butane, tert-butylhydroperoxide, cumene hydroperoxide, diisopropylbenzene hydroperoxide, 2,5-dimethylhexane-2,5-dihydroperoxide, 1,1,3,3-tetramethylbutyl hydroperoxide, tert-butylcumyl peroxide, dicumyl peroxide, 2,5-dimethyl-2,5-di(tert-butylperoxy)hexane, 2,5-oxanoyl peroxide, peroxy succinic acid, benzoyl peroxide, 2,4-dichlorobenzoyl peroxide, diisopropylperoxy dicarbonate, di-2-ethylhexylperoxy dicarbonate, di-2-ethoxyethylperoxy dicarbonate, dimethoxyisopropylperoxy dicarbonate, di(3-methyl-3-methoxybutyl)peroxy dicarbonate, tert-butylperoxy acetate, tert-butylperoxy pivalate, tert-butylperoxy neodecanoate, tert-butylperoxy octanoate, tert-butylperoxy laurate, tersyl carbonate, 3,3',4,4'-tetra(tert-butylperoxycarbonyl)benzophenone, 3,3',4,4'-tetra(tert-hexylperoxycarbonyl)benzophenone, 3,3',4,4'-tetra(p-isopropylcumylperoxycarbonyl)benzophenone, carbonyl di(tert-butylperoxydihydrogen diphthalate) and carbonyl di(tert-hexylperoxydihydrogen diphthalate).

The metallocene compounds described above include, for example, various titanocene compounds described in JP-A-59-152396, JP-A-61-151197, JP-A-63-41484, JP-A-2-249, JP-A-2-4705 and JP-A-5-83588, for example, dicyclopentadienyl-Ti-bisphenyl, dicyclopentadienyl-Ti-bis-2,6-difluorophen-1-yl, dicyclopentadienyl-Ti-bis-2,4-difluorophen-1-yl, dicyclopentadienyl-Ti-bis-2,4,6-triafluorophen-1-yl, dicyclopentadienyl-Ti-bis-2,3,5,6-tetrafluorophen-1-yl, dicyclopentadienyl-Ti-bis-2,3,4,5,6-pentafluorophen-1-yl, dimethylcyclopentadienyl-Ti-bis-2,6-difluorophen-1-yl, dimethylcyclopentadienyl-Ti-bis-2,4,6-triafluorophen-1-yl, dimethylcyclopentadienyl-Ti-bis-2,3,5,6-tetrafluorophen-1-yl or dimethylcyclopentadienyl-Ti-bis-2,3,4,5,6-pentafluorophen-1-yl, and iron-arene complexes described in JP-A-1-304453 and JP-A-1-152109.

The hexaarylbiimidazole compounds described above include, for example, various compounds described in JP-B-6-29285 and U.S. Pat. Nos. 3,479,185, 4,311,783 and 4,622,286, specifically, for example, 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole and 2,2'-bis(o-trifluoromethylphenyl)-4,4',5,5'-tetraphenylbiimidazole.

The organic boric acid compounds described above include, for example, organic boric acid salts described in JP-A-62-143044, JP-A-62-150242, JP-A-9-188685, JP-A-9-188686, JP-A-9-188710, JP-A-2000-131837, JP-A-2002-107916, Japanese Patent 2764769, JP-A-2002-116539 and Martin Kunz, Rad Tech '98, Proceeding Apr. 19-22 (1998), Chicago, organic boron sulfonium complexes or organic boron oxosulfonium complexes described in JP-A-6-157623, JP-A-6-175564 and JP-A-6-175561, organic boron iodonium complexes described in JP-A-6-175554 and JP-A-6-175553, organic boron phosphonium complexes described in JP-A-9-188710, and organic boron transition metal coordination complexes described in JP-A-6-348011, JP-A-7-128785, JP-A-7-140589, JP-A-7-306527 and JP-A-7-292014.

The disulfone compounds described above include, for example, compounds described in JP-A-61-166544 and JP-A-2002-328465.

The oxime ester compounds described above include, for example, compounds described in J. C. S. Perkin II, 1653-1660 (1979), J. C. S. Perkin II, 156-162 (1979), Journal of Photopolymer Science and Technology, 202-232 (1995) and JP-A-2000-66385, and compounds described in JP-A-2000-80068, and specifically, compounds represented by the following formulae:

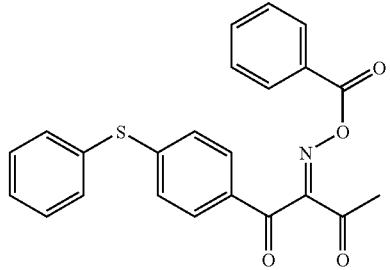

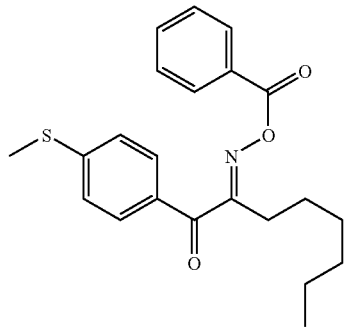

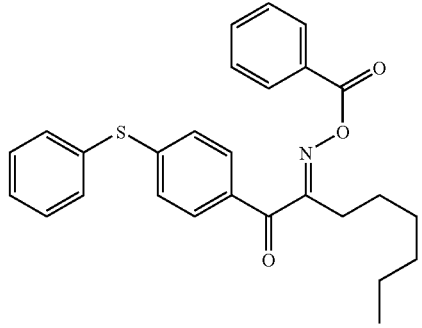

-continued
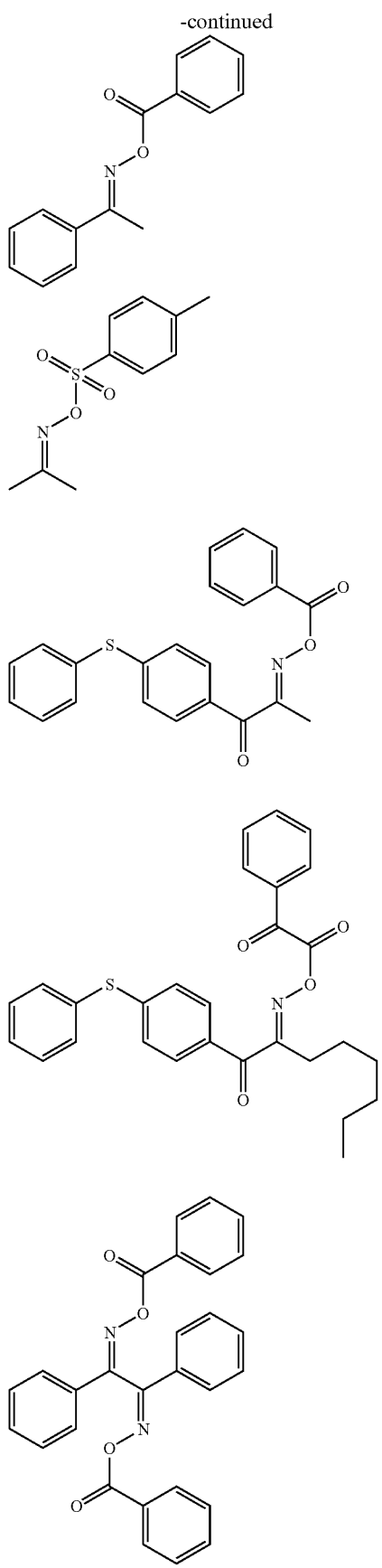
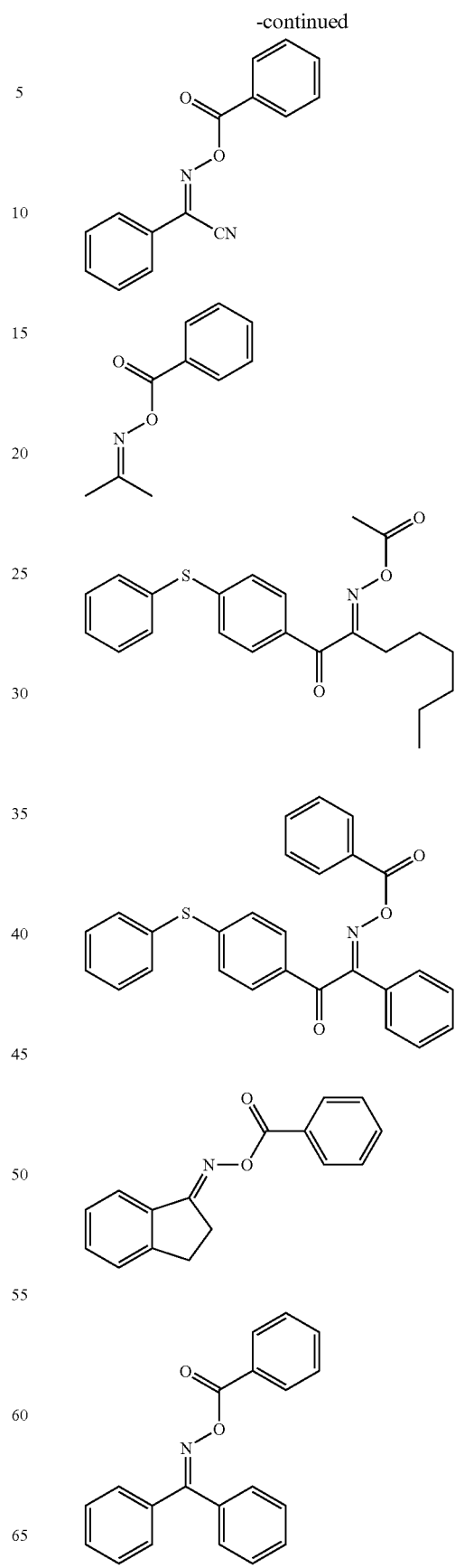

-continued

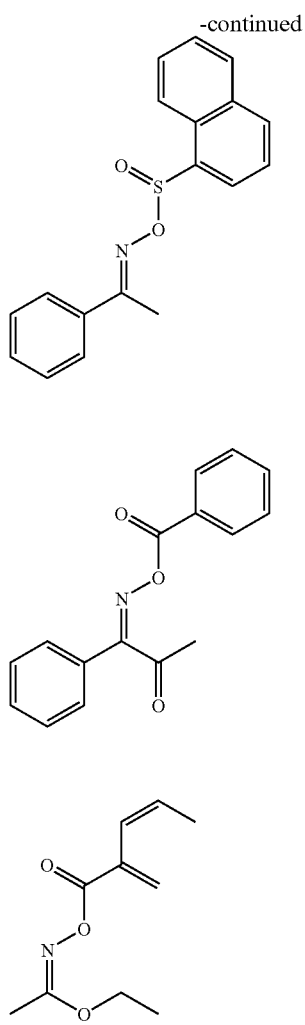

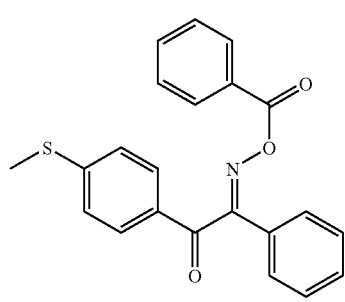

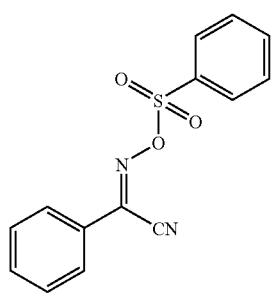

-continued

The onium salt compounds described above include, for example, diazonium salts described in S. I. Schlesinger, *Photogr. Sci. Ens.*, 18, 387 (1974) and T. S. Bal et al., *Polymer*, 21, 423 (1980), ammonium salts described in U.S. Pat. No. 4,069,055 and JP-A-4-365049, phosphonium salts described in U.S. Pat. Nos. 4,069,055 and 4,069,056, iodonium salts described in European Patent 104,143, U.S. Pat. Nos. 339,049 and 410,201, JP-A-2-150848 and JP-A-2-296514, sulfonium salts described in European Patents 370,693, 390,214, 233,567, 297,443 and 297,442, U.S. Pat. Nos. 4,933,377, 161,811, 410,201, 339,049, 4,760,013, 4,734,444 and 2,833,827 and German Patents 2,904,626, 3,604,580 and 3,604,581, selenonium salts described in J. V. Crivello et al., *Macromolecules*, 10 (6), 1307 (1977) and J. V. Crivello et al., *J. Polymer Sci., Polymer Chem. Ed.*, 17, 1047 (1979), and arsonium salts described in C. S. Wen et al., *Teh Proc. Conf. Rad. Curing ASIA*, p. 478, Tokyo, October (1988).

Particularly, in view of reactivity and stability, the oxime ester compounds and diazonium compounds, iodonium compounds and sulfonium compounds described above are illustrated. In the invention, the onium salt functions not as an acid generator, but as an ionic radical polymerization initiator.

The onium salts preferably used in the invention include onium salts represented by the following formulae (RI-I) to (RI-III):

  (RI-I)

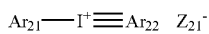  (RI-II)

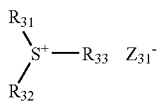  (RI-III)

In formula (RI-I), $Ar_{11}$ represents an aryl group having 20 or less carbon atoms, which may have 1 to 6 substituents. Preferred example of the substituent includes an alkyl group having from 1 to 12 carbon atoms, an alkenyl group having from 1 to 12 carbon atoms, an alkynyl group having from 1 to 12 carbon atoms, an aryl group having from 1 to 12 carbon atoms, an alkoxy group having from 1 to 12 carbon atoms, an aryloxy group having from 1 to 12 carbon atoms, a halogen atom, an alkylamino group having from 1 to 12 carbon atoms, a dialkylimino group having from 1 to 12 carbon atoms, an alkylamido group or arylamido group having from 1 to 12 carbon atoms, a carbonyl group, a carboxy group, a cyano group, a sulfonyl group, an thioalkyl group having from 1 to 12 carbon atoms and an thioaryl group having from 1 to 12 carbon atoms. $Z_{11}^-$ represents a monovalent anion. Specific examples of the monovalent anion include a halogen ion, a perchlorate ion, a hexafluorophosphate ion, a tetrafluoroborate ion, a sulfonate ion, a sulfinate ion, a thosulfonate ion and a sulfate ion. Among them, a perchlorate ion, a hexafluorophosphate ion, a tetrafluoroborate ion, a sulfonate ion and a sulfinate ion are preferred in view of stability.

In the formula (RI-II), $Ar_{21}$ and $Ar_{22}$ each independently represents an aryl group having 20 or less carbon atoms, which may have 1 to 6 substituents. Preferred example of the substituent includes an alkyl group having from 1 to 12 carbon atoms, an alkenyl group having from 1 to 12 carbon atoms, an alkynyl group having from 1 to 12 carbon atoms, an aryl group having from 1 to 12 carbon atoms, an alkoxy group having from 1 to 12 carbon atoms, an aryloxy group having from 1 to 12 carbon atoms, a halogen atom, an alkylamino group having from 1 to 12 carbon atoms, a dialkylimino group having from 1 to 12 carbon atoms, an alkylamido group or arylamido group having from 1 to 12 carbon atoms, a carbonyl group, a carboxy group, a cyano group, a sulfonyl group, an thioalkyl group having from 1 to 12 carbon atoms and an thioaryl group having from 1 to 12 carbon atoms. $Z_{21}^-$ represents a monovalent anion. Specific examples of the monovalent anion include a halogen ion, a perchlorate ion, a hexafluorophosphate ion, a tetrafluoroborate ion, a sulfonate ion, a sulfinate ion, a thosulfonate ion, a sulfate ion and a carboxylate ion. Among them, a perchlorate ion, a hexafluorophosphate ion, a tetrafluoroborate ion, a sulfonate ion, a sulfinate ion and a carboxylate ion are preferred in view of stability and reactivity.

In the formula (RI-III), $R_{31}$, $R_{32}$ and $R_{33}$ each independently represents an aryl group having 20 or less carbon atoms, which may have 1 to 6 substituents, an alkyl group, an alkenyl group or an alkynyl group. Among them, the aryl group is preferred in view of reactivity and stability. Preferred example of the substituent includes an alkyl group having from 1 to 12 carbon atoms, an alkenyl group having from 1 to 12 carbon atoms, an alkynyl group having from 1 to 12 carbon atoms, an aryl group having from 1 to 12 carbon atoms, an alkoxy group having from 1 to 12 carbon atoms, an aryloxy group having from 1 to 12 carbon atoms, a halogen atom, an alkylamino group having from 1 to 12 carbon atoms, a dialkylimino group having from 1 to 12 carbon atoms, an alkylamido group or arylamido group having from 1 to 12 carbon atoms, a carbonyl group, a carboxy group, a cyano group, a sulfonyl group, an thioalkyl group having from 1 to 12 carbon atoms and an thioaryl group having from 1 to 12 carbon atoms. $Z_{31}^-$ represents a monovalent anion. Specific examples of the monovalent anion include a halogen ion, a perchlorate ion, a hexafluorophosphate ion, a tetrafluoroborate ion, a sulfonate ion, a sulfinate ion, a thosulfonate ion, a sulfate ion and a carboxylate ion. Among them, a perchlorate ion, a hexafluorophosphate ion, a tetrafluoroborate ion, a sulfonate ion, a sulfinate ion and a carboxylate ion are preferred in view of stability and reactivity. Carboxylate ions described in JP-A-2001-343742 are more preferable, and carboxylate ions described in JP-A-2002-148790 are particularly preferable.

Specific examples of the onium salt compound preferably used in the invention are set forth below, but the invention should not be construed as being limited thereto.

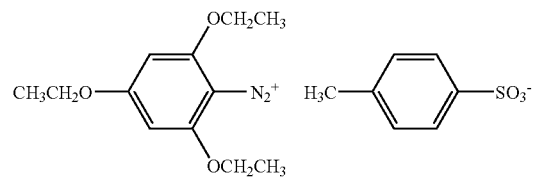

(N-1)

(N-2) $PF_6^-$

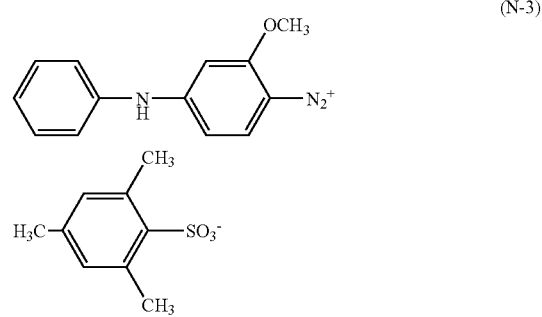

(N-3)

(N-4) $ClO_4^-$ (N-5) $PF_6^-$ (N-6)

(N-7) $BF_4^-$ (N-8)

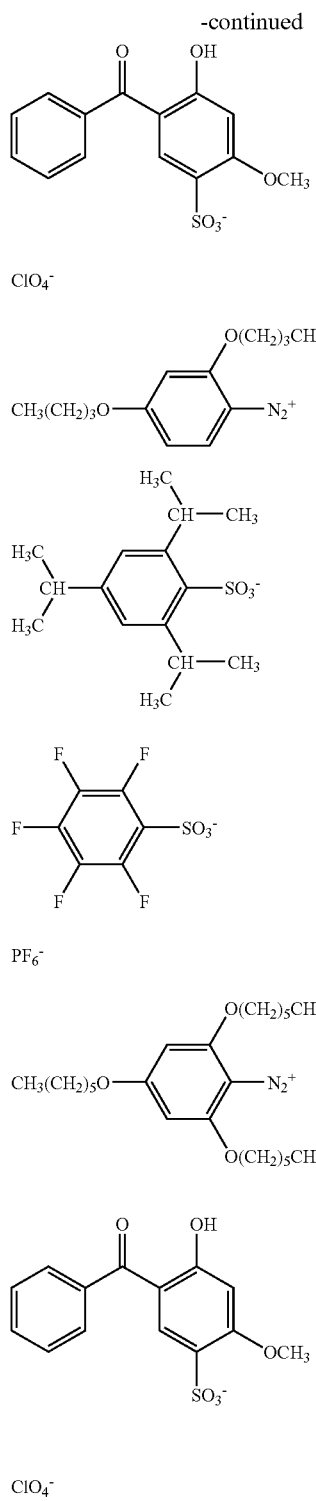
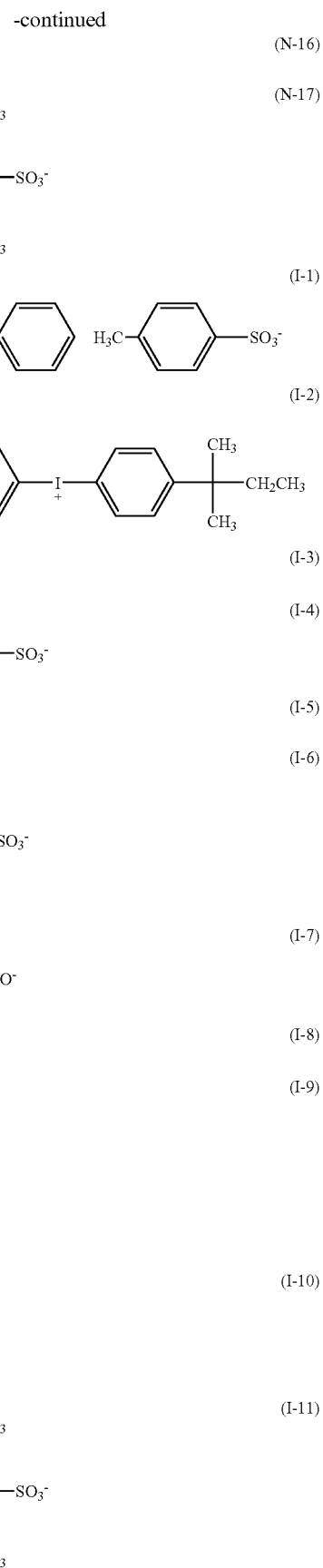

-continued
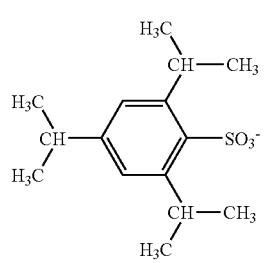 (I-12)
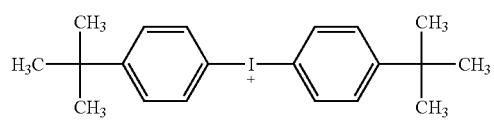 (I-13)
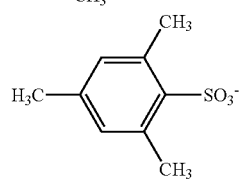
ClO$_4^-$ (I-14)
PF$_6^-$ (I-15)
C$_4$F$_9$SO$_3^-$ (I-16)
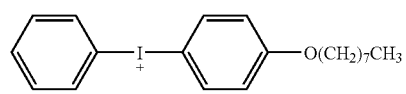 (I-17)
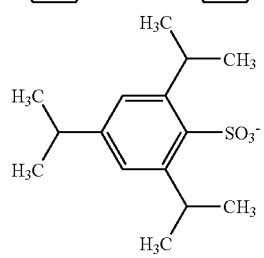
CF$_3$COO$^-$ (I-18)
CF$_3$SO$_3^-$ (I-19)
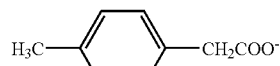 (I-20)
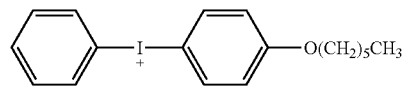 (I-21)
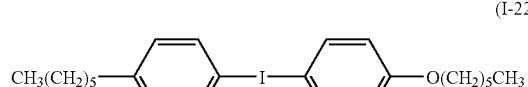 (I-22)
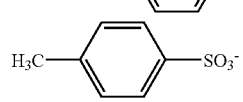
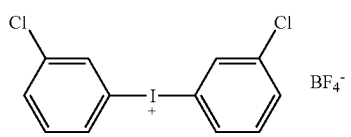 (I-23)
 (I-24)
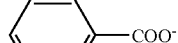 (I-25)
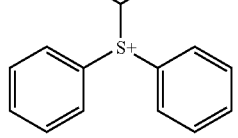 (S-1)
PF$_6^-$ (S-2)
ClO$_4^-$ (S-3)
 (S-4)
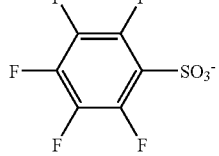
 (S-5)
CF$_3$SO$_3^-$ (S-6)
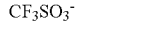 (S-7)
 (S-8)
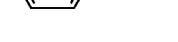 (S-9)
 (S-10)

(S-11)
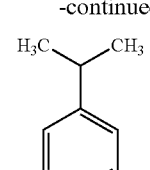

(S-12)
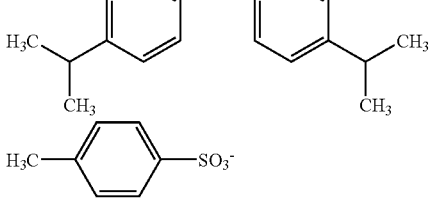

(S-13)

-continued

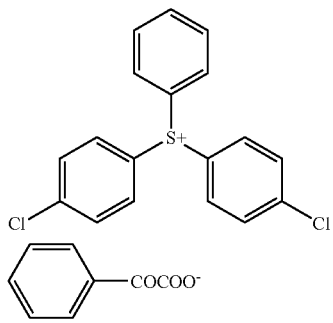

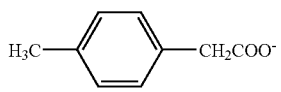

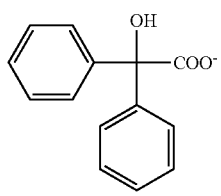

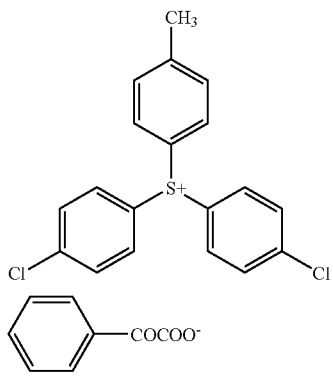

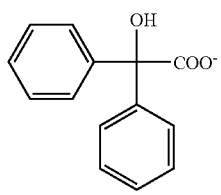

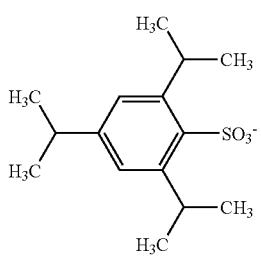

(S-14)

(S-15)

(S-16)

(S-17)

(S-18)

The polymerization initiator can be added preferably in an amount from 0.1 to 50% by weight, more preferably from 0.5 to 30% by weight, particularly preferably from 1 to 20% by weight, based on the total solid content of the image-recording layer. In the above-described range, good sensitivity and favorable stain resistance in the non-image area at the time of printing are achieved. The polymerization initiators may be used individually or in combination of two or more thereof. Further, the polymerization initiator may be added together with other components to one layer or may be added to a different layer separately provided.

<Polymerizable Compound>

It is preferred that the image-recording layer according to the invention contains a polymerizable compound in order to perform an effective hardening reaction. The polymerizable compound which can be used in the invention is an addition-polymerizable compound having at least one ethylenically unsaturated double bond and it is selected from compounds having at least one, preferably two or more, terminal ethylenically unsaturated double bonds. Such compounds are widely known in the field of art and they can be used in the invention without any particular limitation. The compound has a chemical form, for example, a monomer, a prepolymer, specifically, a dimer, a trimer or an oligomer, or a copolymer thereof, or a mixture thereof. Examples of the monomer and copolymer thereof include unsaturated carboxylic acids (for example, acrylic acid, methacrylic acid, itaconic acid, crotonic acid, isocrotonic acid or maleic acid) and esters or amides thereof. Preferably, esters of an unsaturated carboxylic acid with an aliphatic polyhydric alcohol compound and amides of an unsaturated carboxylic acid with an aliphatic polyvalent amine compound are used. An addition reaction product of an unsaturated carboxylic acid ester or amide having a nucleophilic substituent, for example, a hydroxy group, an amino group or a mercapto group, with a monofunctional or polyfunctional isocyanate or epoxy, or a dehydration condensation reaction product of the unsaturated carboxylic acid ester or amide with a monofunctional or polyfunctional carboxylic acid is also preferably used. Furthermore, an addition reaction product of an unsaturated carboxylic acid ester or amide having an electrophilic substituent, for example, an isocyanate group or an epoxy group with a monofunctional or polyfunctional alcohol, amine or thiol, or a substitution reaction product of an unsaturated carboxylic acid ester or amide having a releasable substituent, for example, a halogen atom or a tosyloxy group with a monofunctional or polyfunctional alcohol, amine or thiol is also preferably used. In addition, compounds in which the unsaturated carboxylic acid described above is replaced by an unsaturated phosphonic acid, styrene, vinyl ether or the like can also be used.

Specific examples of the monomer, which is an ester of an aliphatic polyhydric alcohol compound with an unsaturated carboxylic acid, include acrylic acid esters, for example, ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer or isocyanuric acid EO modified triacrylate; methacrylic acid esters, for example, tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane or bis[p-(methacryloxyethoxy)phenyl]dimethylmethane; itaconic acid esters, for example, ethylene glycol diitaconate, propylene glycol diitaconate, 1,3-butanediol diitaconate, 1,4-butanediol diitaconate, tetramethylene glycol diitaconate, pentaerythritol diitaconate or sorbitol tetraitaconate; crotonic acid esters, for example, ethylene glycol dicrotonate, tetramethylene glycol dicrotonate, pentaerythritol dicrotonate or sorbitol tetradicrotonate; isocrotonic acid esters, for example, ethylene glycol diisocrotonate, pentaerythritol diisocrotonate or sorbitol tetraisocrotonate; and maleic acid esters, for example, ethylene glycol dimaleate, triethylene glycol dimaleate, pentaerythritol dimaleate and sorbitol tetramaleate.

Other examples of the ester, which can be preferably used, include aliphatic alcohol esters described in JP-B-51-47334 and JP-A-57-196231, esters having an aromatic skeleton described in JP-A-59-5240, JP-A-59-5241 and JP-A-2-226149, and esters containing an amino group described in JP-A-1-165613.

The above-described ester monomers can also be used as a mixture.

Specific examples of the monomer, which is an amide of an aliphatic polyvalent amine compound with an unsaturated carboxylic acid, include methylene bisacrylamide, methylene bismethacrylamide, 1,6-hexamethylene bisacrylamide, 1,6-hexamethylene bismethacrylamide, diethylenetriamine trisacrylamide, xylylene bisacrylamide and xylylene bismethacrylamide. Other preferred examples of the amide monomer include amides having a cyclohexylene structure described in JP-B-54-21726.

Urethane type addition polymerizable compounds produced using an addition reaction between an isocyanate and a hydroxy group are also preferably used, and specific examples thereof include vinylurethane compounds having two or more polymerizable vinyl groups per molecule obtained by adding a vinyl monomer containing a hydroxy group represented by formula (A) shown below to a polyisocyanate compound having two or more isocyanate groups per molecule, described in JP-B-48-41708.

$$CH_2=C(R_4)COOCH_2CH(R_5)OH \qquad (A)$$

wherein $R_4$ and $R_5$ each independently represents H or $CH_3$.

Also, urethane acrylates described in JP-A-51-37193, JP-B-2-32293 and JP-B-2-16765, and urethane compounds having an ethylene oxide skeleton described in JP-B-58-49860, JP-B-56-17654, JP-B-62-39417 and JP-B-62-39418 are preferably used. Furthermore, a photopolymerizable composition having remarkably excellent photosensitive speed can be obtained by using an addition polymerizable compound having an amino structure or a sulfide structure in its molecule, described in JP-A-63-277653, JP-A-63-260909 and JP-A-1-105238.

Other examples include polyfunctional acrylates and methacrylates, for example, polyester acrylates and epoxy acrylates obtained by reacting an epoxy resin with acrylic acid or methacrylic acid, described in JP-A-48-64183, JP-B-49-43191 and JP-B-52-30490. Specific unsaturated compounds described in JP-B-46-43946, JP-B-1-40337 and JP-B-1-40336, and vinylphosphonic acid type compounds described in JP-A-2-25493 can also be exemplified. In some cases, structure containing a perfluoroalkyl group described in JP-A-61-22048 can be preferably used. Moreover, photocurable monomers or oligomers described in Nippon Secchaku Kyokaishi (Journal of Japan Adhesion Society), Vol. 20, No. 7, pages 300 to 308 (1984) can also be used.

Details of the method of using the polymerizable compound, for example, selection of the structure, individual or combination use, or an amount added, can be appropriately arranged depending on the characteristic design of the final lithographic printing plate precursor. For instance, the compound is selected from the following standpoints.

In view of the sensitivity, a structure having a large content of unsaturated groups per molecule is preferred and in many cases, a bifunctional or more functional compound is preferred. In order to increase the strength of image area, that is, hardened layer, a trifunctional or more functional compound is preferred. A combination use of compounds different in the functional number or in the kind of polymerizable group (for example, an acrylic acid ester, a methacrylic acid ester, a styrene compound or a vinyl ether compound) is an effective method for controlling both the sensitivity and the strength.

The selection and use method of the polymerizable compound are also important factors for the compatibility and dispersibility with other components (for example, a binder polymer, a polymerization initiator or a coloring agent) in the image-recording layer. For instance, the compatibility may be improved in some cases by using the compound of low purity or using two or more kinds of the compounds in combination. A specific structure may be selected for the purpose of improving an adhesion property to a support or a protective layer described hereinafter.

The polymerizable compound is preferably used in an amount from 5 to 80% by weight, more preferably from 25 to 75% by weight, based on the nonvolatile component of the image-recording layer. The polymerizable compounds may be used individually or in combination of two or more thereof. In the method of using the polymerizable compound, the structure, blend and amount added can be appropriately selected by taking account of the extent of polymerization inhibition due to oxygen, resolution, fogging property, change in refractive index, surface adhesion and the like. Further, depending on the case, a layer construction, for example, an undercoat layer or an overcoat layer, and a coating method, may also be considered.

<Binder Polymer>

A binder polymer which can be used in the invention can be selected from those heretofore known without restriction, and linear organic polymers having a film forming property are preferable. Examples of the binder polymer include acrylic resins, polyvinyl acetal resins, polyurethane resins, polyurea resins, polyimide resins, polyamide resins, epoxy resins, methacrylic resins, polystyrene resins, novolac type phenolic resins, polyester resins, synthesis rubbers and natural rubbers.

The binder polymer preferably has a crosslinkable property in order to improve the film strength of the image area. In order to impart the crosslinkable property to the binder polymer, a crosslinkable functional group, for example, an ethylenically unsaturated bond is introduced into a main chain or side chain of the polymer. The crosslinkable functional group may be introduced by copolymerization.

Examples of the polymer having an ethylenically unsaturated bond in the main chain thereof include poly-1,4-butadiene and poly-1,4-isoprene.

Examples of the polymer having an ethylenically unsaturated bond in the side chain thereof include a polymer of an ester or amide of acrylic acid or methacrylic acid, which is a polymer wherein the ester or amide residue (R in —COOR or —CONHR) has an ethylenically unsaturated bond.

Examples of the residue (R described above) having an ethylenically unsaturated bond include —$(CH_2)_nCR^1$=$CR^2R^3$, —$(CH_2O)_nCH_2CR^1$=$CR^2R^3$, —$(CH_2CH_2O)_nCH_2CR^1$=$CR^2R^3$, —$(CH_2)_nNH$—CO—O—$CH_2CR^1$=$CR^2R^3$, —$(CH_2)_n$—O—CO—$CR^1$=$CR^2R^3$ and —$(CH_2CH_2O)_2$—X (wherein $R^1$ to $R^3$ each represents a hydrogen atom, a halogen atom or an alkyl group having from 1 to 20 carbon atoms, an aryl group, alkoxy group or aryloxy group, or $R^1$ and $R^2$ or $R^1$ and $R^3$ may be combined with each other to form a ring. n represents an integer of 1 to 10. X represents a dicyclopentadienyl residue).

Specific examples of the ester residue include —$CH_2CH$=$CH_2$ (described in JP-B-7-21633), —$CH_2CH_2O$—$CH_2CH$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—NHCOO—$CH_2CH$=$CH_2$ and —$CH_2CH_2O$—X (wherein X represents a dicyclopentadienyl residue).

Specific examples of the amide residue include —$CH_2CH$=$CH_2$, —$CH_2CH_2$—Y (wherein Y represents a cyclohexene residue) and —$CH_2CH_2$—OCO—$CH$=$CH_2$.

The binder polymer having crosslinkable property is hardened, for example, by adding a free radical (a polymerization initiating radical or a growing radical of a polymerizable compound during polymerization) to the crosslinkable functional group of the polymer and undergoing addition polymerization between the polymers directly or through a polymerization chain of the polymerizable compound to form crosslinkage between the polymer molecules. Alternately, it is hardened by generation of a polymer radical upon extraction of an atom in the polymer (for example, a hydrogen atom on a carbon atom adjacent to the functional crosslinkable group) by a free radical and connecting the polymer radicals with each other to form cross-linkage between the polymer molecules.

A content of the crosslinkable group in the binder polymer (content of the radical polymerizable unsaturated double bond determined by iodine titration) is preferably from 0.1 to 10.0 mmol, more preferably from 1.0 to 7.0 mmol and most preferably from 2.0 to 5.5 mmol, based on 1 g of the binder polymer. In the above-described range, preferable sensitivity and good preservation stability can be obtained.

From the standpoint of improvement in the on-machine development property, it is preferred that the binder polymer has high solubility or dispersibility in ink and/or dampening water.

In order to improve the solubility or dispersibility in the ink, the binder polymer is preferably oleophilic and in order to improve the solubility or dispersibility in the dampening water, the binder polymer is preferably hydrophilic. Therefore, it is effective in the invention that an oleophilic binder polymer and a hydrophilic binder polymer are used in combination.

The hydrophilic binder polymer preferably includes, for example, a polymer having a hydrophilic group, for example, a hydroxy group, a carboxy group, a carboxylate group, a hydroxyethyl group, a polyoxyethyl group, a hydroxypropyl group, a polyoxypropyl group, an amino group, an aminoethyl group, an aminopropyl group, an ammonium group, an amido group, a carboxymethyl group, a sulfonic acid group or a phosphoric acid group.

Specific examples thereof include gum arabic, casein, gelatin, a starch derivative, carboxy methyl cellulose and a sodium salt thereof, cellulose acetate, sodium alginate, vinyl acetate-maleic acid copolymer, styrene-maleic acid copolymer, polyacrylic acid and a salt thereof, polymethacrylic acid and a salt thereof, a homopolymer or copolymer of hydroxyethyl methacrylate, a homopolymer or copolymer of hydroxyethyl acrylate, a homopolymer or copolymer of hydroxypropyl methacrylate, a homopolymer or copolymer of hydroxypropyl acrylate, a homopolymer or copolymer of hydroxybutyl methacrylate, a homopolymer or copolymer of hydroxybutyl acrylate, a polyethylene glycol, a hydroxypropylene polymer, a polyvinyl alcohol, a hydrolyzed polyvinyl acetate having a hydrolysis degree of 60% by mole or more, preferably 80% by mole or more, a polyvinyl formal, a polyvinyl butyral, a polyvinyl pyrrolidone, a homopolymer or copolymer of acrylamide, a homopolymer or polymer of methacrylamide, a homopolymer or copolymer of N-methylolacrylamide, a polyvinyl pyrrolidone, an alcohol-soluble nylon, a polyether of 2,2-bis-(4-hydroxyphenyl)propane and epichlorohydrin.

A weight average molecular weight of the binder polymer is preferably 5,000 or more, more preferably from 10,000 to 300,000. A number average molecular weight of the binder polymer is preferably 1,000 or more, more preferably from 2,000 to 250,000. The polydispersity (weight average molecular weight/number average molecular weight) thereof is preferably from 1.1 to 10.

The binder polymer may be any of a random polymer and a block polymer, and it is preferably a random polymer. The binder polymers may be used individually or as a mixture of two or more thereof.

The binder polymer can be synthesized by a conventionally known method. A solvent used for the synthesis include, for example, tetrahydrofuran, ethylene dichloride, cyclohexanone, methyl ethyl ketone, acetone, methanol, ethanol, ethylene glycol monomethyl ether, ethylene glycol monoethyl ether, 2-methoxyethyl acetate, diethylene glycol dimethyl ether, 1-methoxy-2-propanol, 1-methoxy-2-propylacetate, N,N-dimethylformamide, N,N-dimethylacetoamide, toluene, ethyl acetate, methyl lactate, ethyl lactate, dimethylsulfoxide and water. The solvents may be used individually or as a mixture of two or more thereof.

As a radical polymerization initiator used for the synthesis of binder polymer, a known compound, for example, an azo-type initiator or a peroxide initiator can be employed.

A content of the binder polymer is preferably, from 0 to 90% by weight, more preferably from 0 to 80% by weight, and still more preferably from 0 to 70% by weight, based on the total solid content of the image-recording layer. In the above-described range, good strength of the image area and preferable image-forming property can be obtained.

It is preferred that the polymerizable compound and the binder polymer are used in a weight ratio of 0.5/1 to 4/1.

<Surfactant>

It is preferred to use a surfactant in the image-recording layer according to the invention in order to promote the on-machine development property at the start of printing, to improve the state of coated surface, or the like. The surfactant used includes, for example, a nonionic surfactant, an anionic surfactant, a cationic surfactant, an amphoteric surfactant and a fluorine-based surfactant. The surfactants may be used individually or in combination of two or more thereof.

The nonionic surfactant used in the invention is not particular restricted, and those hitherto known can be used. Examples of the nonionic surfactant include polyoxyethylene alkyl ethers, polyoxyethylene alkyl phenyl ethers, polyoxyethylene polystyryl phenyl ethers, polyoxyethylene polyoxypropylene alkyl ethers, glycerin fatty acid partial esters, sorbitan fatty acid partial esters, pentaerythritol fatty acid partial esters, propylene glycol monofatty acid esters, sucrose fatty acid partial esters, polyoxyethylene sorbitan fatty acid partial esters, polyoxyethylene sorbitol fatty acid partial esters, polyethylene glycol fatty acid esters, polyglycerol fatty acid partial esters, polyoxyethylenated castor oils, polyoxyethylene glycerol fatty acid partial esters, fatty acid diethanolamides, N,N-bis-2-hydroxyalkylamines, polyoxyethylene alkylamines, triethanolamine fatty acid esters, trialylamine oxides, polyethylene glycols, and copolymers of polyethylene glycol and polypropylene glycol.

The anionic surfactant used in the invention is not particularly restricted and those hitherto known can be used. Examples of the anionic surfactant include fatty acid salts, abietic acid salts, hydroxyalkanesulfonic acid salts, alkanesulfonic acid salts, dialkylsulfosuccinic ester salts, straight-chain alkylbenzenesulfonic acid salts, branched alkylbenzenesulfonic acid salts, alkylnaphthalenesulfonic acid salts, alkylphenoxypolyoxyethylene propylsulfonic acid salts, polyoxyethylene alkylsulfophenyl ether salts, N-methyl-N-oleyltaurine sodium salt, N-alkylsulfosuccinic monoamide disodium salts, petroleum sulfonic acid salts, sulfated beef tallow oil, sulfate ester slats of fatty acid alkyl ester, alkyl sulfate ester salts, polyoxyethylene alkyl ether sulfate ester salts, fatty acid monoglyceride sulfate ester salts, polyoxyethylene alkyl phenyl ether sulfate ester salts, polyoxyethylene styrylphenyl ether sulfate ester salts, alkyl phosphate ester salts, polyoxyethylene alkyl ether phosphate ester salts, polyoxyethylene alkyl phenyl ether phosphate ester salts, partial saponification products of styrene/maleic anhydride copolymer, partial saponification products of olefin/maleic anhydride copolymer and naphthalene sulfonate formalin condensates.

The cationic surfactant used in the invention is not particularly restricted and those hitherto known can be used. Examples of the cationic surfactant include alkylamine salts, quaternary ammonium salts, polyoxyethylene alkyl amine salts and polyethylene polyamine derivatives.

The amphoteric surfactant used in the invention is not particularly restricted and those hitherto known can be used. Examples of the amphoteric surfactant include carboxybetaines, aminocarboxylic acids, sulfobetaines, aminosulfuric esters, and imidazolines.

In the surfactants described above, the term "polyoxyethylene" can be replaced with "polyoxyalkylene", for example, polyoxymethylene, polyoxypropylene or polyoxybutylene, and such surfactants can also be used in the invention.

Further, a preferred surfactant includes a fluorine-based surfactant containing a perfluoroalkyl group in its molecule. Examples of the fluorine-based surfactant include an anionic type, for example, perfluoroalkyl carboxylates, perfluoroalkyl sulfonates or perfluoroalkylphosphates; an amphoteric type, for example, perfluoroalkyl betaines; a cationic type, for example, perfluoroalkyl trimethyl ammonium salts; and a nonionic type, for example, perfluoroalkyl amine oxides, perfluoroalkyl ethylene oxide adducts, oligomers having a perfluoroalkyl group and a hydrophilic group, oligomers having a perfluoroalkyl group and an oleophilic group, oligomers having a perfluoroalkyl group, a hydrophilic group and an oleophilic group or urethanes having a perfluoroalkyl group and an oleophilic group. Further, fluorine-based surfactants described in JP-A-62-170950, JP-A-62-226143 and JP-A-60-168144 are also preferably exemplified.

The surfactants can be used individually or in combination of two or more thereof.

A content of the surfactant is preferably from 0.001 to 10% by weight, more preferably from 0.01 to 7% by weight, based on the total solid content of the image-recording layer.

<Coloring Agent>

To the image-recording layer according to the invention, various compounds other than those described above may further be added, if desired. For instance, a dye having a large absorption in the visible region can be used as a coloring agent of the image formed. Specifically, the dye includes Oil yellow #101, Oil yellow #103, Oil pink #312, Oil green BG, Oil blue BOS, Oil blue #603, Oil black BY, Oil black BS, Oil black T-505 (produced by Orient Chemical Industries, Ltd.), Victoria pure blue, Crystal violet (CI42555), Methyl violet (CI42535), Ethyl violet, Rhodamine B (CI45170B), Malachite green (CI42000), Methylene blue (CI52015) and dyes described in JP-A-62-293247. Further, a pigment, for example, a phthalocyanine pigment, an azo pigment, carbon black or titanium oxide can also preferably be used.

It is preferred to add the coloring agent since distinction between the image area and the non-image area is easily conducted after the formation of image. An amount of the coloring agent added is preferably from 0.01 to 10% by weight based on the total solid content of the image-recording layer.

<Print-Out Agent>

To the image-recording layer according to the invention, a compound causing discoloration by an acid or a radical can be added in order to form a print-out image. As such a compound, various kinds of dyes, for example, dyes of diphenylmethane type, triphenylmethane type, triazine type, oxazine type, xanthene type, anthraquinone type, iminoquinone type, azo type and azomethine type are effectively used.

Specific examples thereof include dyes, for example, Brilliant green, Ethyl violet, Methyl green, Crystal violet, basic Fuchsine, Methyl violet 2B, Quinaldine red, Rose Bengal, Methanyl yellow, Thimol sulfophthalein, Xylenol blue, Methyl orange, Paramethyl red, Congo red, Benzo purpurin 4B, α-Naphthyl red, Nile blue 2B, Nile blue A, Methyl violet, Malachite green, Parafuchsine, Victoria pure blue BOH (produced by Hodogaya Chemical Co., Ltd.), Oil blue #603 (produced by Orient Chemical Industries, Ltd.), Oil pink #312

(produced by Orient Chemical Industries, Ltd.), Oil red 5B (produced by Orient Chemical Industries, Ltd.), Oil scarlet #308 (produced by Orient Chemical Industries, Ltd.), Oil red OG (produced by Orient Chemical Industries, Ltd.), Oil red RR (produced by Orient Chemical Industries, Ltd.), Oil green #502 (produced by Orient Chemical Industries, Ltd.), Spiron Red BEH special (produced by Hodogaya Chemical Co., Ltd.), m-Cresol purple, Cresol red, Rhodamine B, Rhodamine 6G, Sulfo rhodamine B, Auramine, 4-p-diethylaminophenyliminonaphthoquione, 2-carboxyanilino-4-p-diethylaminophenyliminonaphthoquinone, 2-carboxystearylamino-4-p-N,N-bis(hydroxyethyl)aminophenyliminonaphthoquinone, 1-phenyl-3-methyl-4-p-diethylaminophenylimino-5-pyrazolon or 1-β-naphtyl-4-p-diethylaminophenylimino-5-pyrazolon, and a leuco dye, for example, p,p',p"-hexamethyltriaminotriphenylmethane (leuco crystal violet) or Pergascript Blue SRB (produced by Ciba Geigy Ltd.).

In addition to those described above, a leuco dye known as a material for heat-sensitive paper or pressure-sensitive paper is also preferably used. Specific examples thereof include crystal violet lactone, malachite green lactone, benzoyl leuco methylene blue,
2-(N-phenyl-N-methylamino)-6-(N-p-tolyl-N-ethyl)aminofluoran,
2-anilino-3-methyl-6-(n-ethyl-p-tolidino)fluoran, 3,6-dimethoxyfluoran,
3-(N,N-diethylamino)-5-methyl-7-(N,N-dibenzylamino)fluoran,
3-(N-cyclohexyl-N-methylamino)-6-methyl-7-anilinofluoran,
3-(N-N-diethylamino)-6-methyl-7-anilinofluoran,
3-(N,N-diethylamino)-6-methyl-7-xylidinofluoran,
3-(N,N-diethylamino)-6-methyl-7-chlorofluoran,
3-(N,N-diethylamino)-6-methoxy-7-aminofluoran,
3-(N,N-diethylamino)-7-(4-chloroanilino)fluoran,
3-(N,N-diethylamino)-7-chlorofluoran,
3-(N,N-diethylamino)-7-benzylaminofluoran,
3-(N,N-diethylamino)-7,8-benzofluoran,
3-(N,N-dibutylamino)-6-methyl-7-anilinofluoran,
3-(N,N-dibutylamino)-6-methyl-7-xylidinofluoran,
3-pipelidino-6-methyl-7-anilinofluoran, 3-pyrrolidino-6-methyl-7-anilinofluoran,
3,3-bis(1-ethyl-2-methylindol-3-yl)phthalide,
3,3-bis(1-n-butyl-2-methylindol-3-yl)phthalide,
3,3-bis(p-dimethylaminophenyl)-6-dimethylaminophthalide,
3-(4-diethylamino-2-ethoxyphenyl)-3-(1-ethyl-2-methylindol-3-yl)-4-phthalide
and 3-(4-diethylaminophenyl)-3-(1-ethyl-2-methylindol-3-yl)phthalide.

The dye discolored by an acid or radical is preferably added in an amount of 0.01 to 10% by weight based on the solid content of the image-recording layer.

<Polymerization Inhibitor>

It is preferred to add a small amount of a thermal polymerization inhibitor to the image-recording layer according to the invention in order to inhibit undesirable thermal polymerization of the polymerizable compound during the production or preservation of the image-recording layer.

The thermal polymerization inhibitor preferably includes, for example, hydroquinone, p-methoxyphenol, di-tert-butyl-p-cresol, pyrogallol, tert-butyl catechol, benzoquinone, 4,4'-thiobis(3-methyl-6-tert-butylphenol), 2,2'-methylenebis(4-methyl-6-tert-butylphenol) and N-nitroso-N-phenylhydroxylamine aluminum salt.

An amount of the thermal polymerization inhibitor added is preferably from about 0.01 to about 5% by weight based on the total solid content of the image-recording layer.

<Higher Fatty Acid Derivative>

To the image-recording layer according to the invention, a higher fatty acid derivative, for example, behenic acid or behenic acid amide may be added to localize on the surface of the image-recording layer during a drying step after coating in order to avoid polymerization inhibition due to oxygen. An amount of the higher fatty acid derivative added is preferably from about 0.1 to about 10% by weight based on the total solid content of the image-recording layer.

<Plasticizer>

The image-recording layer according to the invention may also contain a plasticizer in order to improve the on-machine development property. The plasticizer preferably includes, for example, a phthalic acid ester, e.g., dimethylphthalate, diethylphthalate, dibutylphthalate, diisobutylphthalate, dioctylphthalate, octylcaprylphthalate, dicyclohexylphthalate, ditridecylphthalate, butylbenzylphthalate, diisodecylphthalate or diallylphthalate; a glycol ester, e.g., dimethylglycolphthalate, ehtylphtalylethylglycolate, methylphthalylethylglycolate, butylphthalylbutylglycolate or triethylene glycol dicaprylate ester; a phosphoric acid ester, e.g., tricresylphosphate or triphenylphosphate; an aliphatic dibasic acid ester, e.g., diisobutyladipate, dioctyladipate, dimethylsebacate, dibutylsebacate, dioctylazelate or dibutylmaleate; polyglycidylmethacrylate, triethyl citrate, glycerin triacetyl ester and butyl laurate.

An amount of the plasticizer is preferably about 30% by weight or less based on the total solid content of the image-recording layer.

<Fine Inorganic Particle>

The image-recording layer according to the invention may contain fine inorganic particle in order to increase the hardened film strength in the image area and to improve the on-machine development property in the non-imaging area.

The fine inorganic particle preferably includes, for example, silica, alumina, magnesium oxide, titanium oxide, magnesium carbonate, calcium alginate and a mixture thereof. Even if the fine inorganic particle has no light to heat converting property, it can be used, for example, for strengthening the film or enhancing interface adhesion due to surface roughening.

The fine inorganic particle preferably has an average particle size from 5 nm to 10 μm and more preferably from 0.5 to 3 μm. In the above-described range, it is stably dispersed in the image-recording layer, sufficiently maintains the film strength of the image-recording layer and can form the non-imaging area excellent in hydrophilicity and prevented from stain during printing.

The fine inorganic particle described above is easily available as a commercial product, for example, colloidal silica dispersion.

An amount of the fine inorganic particle added is preferably 20% by weight or less and more preferably 10% by weight or less based on the total solid content of the image-recording layer.

<Hydrophilic Low Molecular Weight Compound>

The image-recording layer according to the invention may contain a hydrophilic low molecular weight compound in order to improve the on-machine development property. The hydrophilic low molecular weight compound includes a water soluble organic compound, for example, a glycol compound, e.g., ethylene glycol, diethylene glycol, triethylene glycol, propylene glycol, dipropylene glycol or tripropylene glycol, or an ether or ester derivative thereof, a polyhydroxy compound, e.g., glycerine or pentaerythritol, an organic amine compound, e.g., triethanol amine, diethanol amine or monoethanol amine, or a salt thereof, an organic sulfonic acid compound, e.g., toluene sulfonic acid or benzene sulfonic acid, or a salt thereof, an organic phosphonic acid compound, e.g., phenyl phosphonic acid, or a salt thereof, an organic carboxylic acid compound, e.g., tartaric acid, oxalic acid, citric acid, malic acid, lactic acid, gluconic acid or an amino acid.

<Formation of Image-recording Layer>

In the invention, several embodiments can be employed in order to incorporate the above-described constituting components of the image-recording layer into the image-recording layer. One embodiment is an image-recording layer of molecular dispersion type prepared by dissolving the constituting components in an appropriate solvent to coat as described, for example, in JP-A-2002-287334. Another embodiment is an image-recording layer of microcapsule type prepared by encapsulating the constituting components of the image-recording layer into microcapsule to incorporate into the image-recording layer as described, for example, in JP-A-2001-277740 and JP-A-2001-277742. In the image-recording layer of microcapsule type, the constituting components may be present outside the microcapsules. It is a more preferable embodiment of the image-recording layer of microcapsule type that hydrophobic constituting components are encapsulated in microcapsules and hydrophilic components are present outside the microcapsules. In order to achieve more preferable on-machine development property, the image-recording layer is preferably the image-recording layer of microcapsule type.

As a method of microencapsulation of the constituting components of the image-recording layer, known methods can be used. Methods of producing the microcapsule include, for example, a method of utilizing coacervation described in U.S. Pat. Nos. 2,800,457 and 2,800,458, a method of using interfacial polymerization described in U.S. Pat. No. 3,287,154, JP-B-38-19574 and JP-B-42-446, a method of using deposition of polymer described in U.S. Pat. Nos. 3,418,250 and 3,660,304, a method of using an isocyanate polyol wall material described in U.S. Pat. No. 3,796,669, a method of using an isocyanate wall material described in U.S. Pat. No. 3,914,511, a method of using a urea-formaldehyde-type or urea-formaldehyde-resorcinol-type wall-forming material described in U.S. Pat. Nos. 4,001,140, 4,087,376 and 4,089,802, a method of using a wall material, for example, a melamine-formaldehyde resin or hydroxycellulose described in U.S. Pat. No. 4,025,445, an in-situ method by monomer polymerization described in JP-B-36-9163 and JP-B-51-9079, a spray drying method described in British Patent 930,422 and U.S. Pat. No. 3,111,407, and an electrolytic dispersion cooling method described in British Patents 952,807 and 967,074, but the invention should not be construed as being limited thereto.

A preferred microcapsule wall used in the invention has three-dimensional crosslinking and has a solvent-swellable property. From this point of view, a preferred wall material of the microcapsule includes polyurea, polyurethane, polyester, polycarbonate, polyamide and a mixture thereof, and polyurea and polyurethane are particularly preferred. Further, a compound having a crosslinkable functional group, for example, an ethylenically unsaturated bond, capable of being introduced into the binder polymer described above may be introduced into the microcapsule wall.

An average particle size of the microcapsule is preferably from 0.01 to 3.0 µm, more preferably from 0.05 to 2.0 µm, and particularly preferably from 0.10 to 1.0 µm. In the above-described range, good resolution and favorable preservation stability can be achieved.

The image-recording layer according to the invention is formed by dissolving or dispersing each of the necessary constituting components described above in a solvent to prepare a coating solution and coating the solution. The solvent used include, for example, ethylene dichloride, cyclohexanone, methyl ethyl ketone, methanol, ethanol, propanol, ethylene glycol monomethyl ether, 1-methoxy-2-propanol, 2-methxyethyl acetate, 1-methoxy-2-propyl acetate, dimethoxyethane, methyl lactate, ethyl lactate, N,N-dimethylacetoamide, N,N-dimethylformamide, tetramethylurea, N-methylpyrrolidone, dimethylsulfoxide, sulfolane, γ-butyrolactone, toluene and water, but the invention should not be construed as being limited thereto. The solvents may be used individually or as a mixture. The solid content concentration of the coating solution is preferably from 1 to 50% by weight.

The image-recording layer according to the invention may also be formed by preparing plural coating solutions by dispersing or dissolving the same or different components described above into the same or different solvents and conducting repeatedly the coating and drying plural times.

A coating amount of the image-recording layer (solid content) formed on a support after drying may be varied according to the intended purpose but is preferably from 0.3 to 3.0 g/m$^2$. In the above-described range, good sensitivity and preferable film property of the image-recording layer can be achieved.

Various methods can be used for the coating. Examples of the coating method include bar coater coating, spin coating, spray coating, curtain coating, dip coating, air knife coating, blade coating and roll coating.

[Support]

A support for use in the lithographic printing plate precursor according to the invention is not particularly restricted as long as it is a dimensionally stable plate-like material. The support includes, for example, paper, paper laminated with plastic (for example, polyethylene, polypropylene or polystyrene), a metal plate (for example, aluminum, zinc or copper plate), a plastic film (for example, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate or polyvinyl acetal film) and paper or a plastic film laminated or deposited with the metal described above. A preferred support includes a polyester film and an aluminum plate. Among them, the aluminum plate is preferred since it has good dimensional stability and is relatively inexpensive.

The aluminum plate includes a pure aluminum plate, an alloy plate comprising aluminum as a main component and containing a trace amount of hetero elements and a thin film of aluminum or aluminum alloy laminated with plastic. The hetero element contained in the aluminum alloy includes, for example, silicon, iron, manganese, copper, magnesium, chromium, zinc, bismuth, nickel and titanium. The content of the hetero element in the aluminum alloy is preferably 10% by weight or less. Although a pure aluminum plate is preferred in the invention, since completely pure aluminum is difficult to be produced in view of the refining technique, the aluminum plate may slightly contain the hetero element. The composition is not specified for the aluminum plate and those materials conventionally known and used can be appropriately utilized.

The thickness of the support is preferably from 0.1 to 0.6 mm, more preferably from 0.15 to 0.4 mm, and still more preferably from 0.2 to 0.3 mm.

In advance of the use of aluminum plate, a surface treatment, for example, roughening treatment or anodizing treatment is preferably performed. The surface treatment facilitates improvement in the hydrophilic property and ensure for adhesion between the image-recording layer and the support. Prior to the roughening treatment of the aluminum plate, a degreasing treatment, for example, with a surfactant, an organic solvent or an aqueous alkaline solution is conducted for removing rolling oil on the surface thereof, if desired.

The roughening treatment of the surface of the aluminum plate is conducted by various methods and includes, for example, mechanical roughening treatment, electrochemical roughening treatment (roughening treatment of electrochemically dissolving the surface) and chemical roughening treatment (roughening treatment of chemically dissolving the surface selectively).

As the method of the mechanical roughening treatment, a known method, for example, ball graining, brush graining, blast graining or buff graining can be used.

The electrochemical roughening treatment method includes, for example, a method of conducting by passing alternating current or direct current in an electrolyte containing an acid, for example, hydrochloric acid or nitric acid. Also, a method of using a mixed acid described in JP-A-54-63902 can be exemplified.

The aluminum plate subjected to the roughening treatment is subjected, if desired, to an alkali etching treatment using an aqueous solution, for example, of potassium hydroxide or sodium hydroxide and further subjected to a neutralizing treatment, and then subjected to an anodizing treatment for improving the abrasion resistance, if desired.

As the electrolyte used for the anodizing treatment of the aluminum plate, various electrolytes capable of forming porous oxide film can be used. Ordinarily, sulfuric acid, hydrochloric acid, oxalic acid, chromic acid or a mixed acid thereof is used. The concentration of the electrolyte can be appropriately determined depending on the kind of the electrolyte.

Since the conditions for the anodizing treatment are varied depending on the electrolyte used, they cannot be defined commonly. However, it is ordinarily preferred that electrolyte concentration in the solution is from 1 to 80% by weight, liquid temperature is from 5 to 70° C., current density is from 5 to 60 A/dm$^2$, voltage is from 1 to 100 V, and electrolysis time is from 10 seconds to 5 minutes. The amount of the anodized film formed is preferably from 1.0 to 5.0 g/m$^2$ and more preferably from 1.5 to 4.0 g/m$^2$. In the above-described range, good printing durability and good scratch resistance in the non-image area of lithographic printing plate can be achieved.

The aluminum plate subjected to the anodizing treatment is then subjected to a hydrophilizing treatment on the surface thereof, if desired. The hydrophilizing treatment includes an alkali metal silicate method described in U.S. Pat. Nos. 2,714,066, 3,181,461, 3,280,734 and 3,902,734. In the method, the support is subjected to an immersion treatment or an electrolytic treatment in an aqueous solution, for example, of sodium silicate. In addition, the hydrophilizing treatment includes, for example, a method of treating with potassium fluorozirconate described in JP-B-36-22063 and a method of treating with polyvinylphosphonic acid described in U.S. Pat. Nos. 3,276,868, 4,153,461 and 4,689,272.

The support preferably has a center line average roughness of 0.10 to 1.2 μm. In the above-described range, good adhesion to the image-recording layer, good printing durability, and good resistance to stain can be achieved.

Further, color density of the support is preferably from 0.15 to 0.65 in terms of a reflection density value. In the above-described range, good image-forming property due to prevention of halation at the image exposure and good plate inspection property after development can be achieved.

[Backcoat Layer]

After applying the surface treatment or forming an undercoat layer to the support, a backcoat layer can be provided on the back surface of the support, if desired.

The backcoat layer preferably used includes, for example, a coating layer comprising an organic polymer compound described in JP-A-5-45885 and a coating layer comprising a metal oxide obtained by hydrolysis and polycondensation of an organic metal compound or an inorganic metal compound described in JP-A-6-35174. Among them, use of an alkoxy compound of silicon, for example, $Si(OCH_3)_4$, $Si(OC_2H_5)_4$, $Si(OC_3H_7)_4$, or $Si(OC_4H_9)_4$ is preferred since the starting material is inexpensive and easily available.

[Undercoat Layer]

In the lithographic printing plate precursor for use in the lithographic printing method according to the invention, an undercoat layer can be provided between the support and the image-recording layer, if desired. It is advantageous that in the case of infrared laser exposure, since the undercoat layer acts as a heat insulating layer, heat generated upon the exposure does not diffuse into the support and is efficiently utilized so that increase in sensitivity can be achieved. Further, the undercoat layer makes removal of the image-recording layer from the support in the unexposed area easy so that the on-machine development property can be improved.

As a compound for the undercoat layer, specifically, for example, a silane coupling agent having an addition-polymerizable ethylenic double bond reactive group described in JP-A-10-282679 and a phosphorus compound having an ethylenic double bond reactive group described in JP-A-2-304441 are preferably exemplified.

As the most preferred compound for undercoat layer, a polymer resin obtained by copolymerization of a monomer having an adsorbing group, a monomer having a hydrophilic group and a monomer having a crosslinkable group is exemplified.

The essential component in the polymer undercoat layer is an adsorbing group to the hydrophilic surface of the support. Whether the adsorptivity to the hydrophilic surface of the support is present or not can be judged, for example, by the following method.

Specifically, a test compound is dissolved in a solvent in which the test compound is easily soluble to prepare a coating solution, and the coating solution is coated and dried on a support so as to have the coating amount after drying of 30 mg/m$^2$. After thoroughly washing the support coated with the test compound using the solvent in which the test compound is easily soluble, the residual amount of the test compound that has not been removed by the washing is measured to calculate the adsorption amount to the support. For measurement of the residual amount, the amount of the residual test compound may be directly determined, or it may be calculated from the amount of the test compound dissolved in the washing solution. The determination for the compound can be performed, for example, by fluorescent X-ray measurement, reflection spectral absorbance measurement or liquid chromatography measurement. The compound having the adsorptivity to support means a compound that remains by 1 mg/m² or more even after conducting the washing treatment described above.

The adsorbing group to the hydrophilic surface of the support is a functional group capable of forming a chemical bond (for example, an ionic bond, a hydrogen bond, a coordinate bond or a bond with intermolecular force) with a substance (for example, metal or metal oxide) or a functional group (for example, a hydroxy group) present on the surface of the support. The adsorbing group is preferably an acid group or a cationic group.

The acid group preferably has an acid dissociation constant (pKa) of 7 or less. Examples of the acid group include a phenolic hydroxy group, a carboxyl group, —SO₃H, —OSO₃H, —PO₃H₂, —OPO₃H₂, —CONHSO₂—, —SO₂NHSO₂— and —COCH₂COCH₃. Among them, —OPO₃H₂ and —PO₃H₂ are particularly preferred. The acid group may be the form of a metal salt.

The cationic group is preferably an onium group. Examples of the onium group include an ammonium group, a phosphonium group, an arsonium group, a stibonium group, an oxonium group, a sulfonium group, a selenonium group, a stannonium group and iodonium group. Among them, the ammonium group, phosphonium group and sulfonium group are preferred, the ammonium group and phosphonium group are more preferred, and the ammonium group is most preferred.

Particularly preferred examples of the monomer having the adsorbing group include compounds represented by the following formula (VI) or (VII):

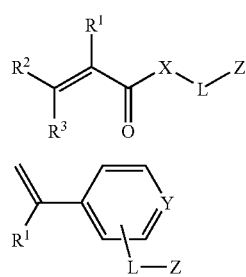

In formula (VI) or (VII), R¹, R₂ and R³ each independently represents a hydrogen atom, halogen atom or an alkyl group having from 1 to 6 carbon atoms. R¹ and R² and R³ each independently represents preferably a hydrogen atom or an alkyl group having from 1 to 6 carbon atoms, more preferably a hydrogen atom or an alkyl group having from 1 to 3 carbon atoms, and most preferably a hydrogen atom or a methyl group. It is particularly preferred that R² and R³ each represents a hydrogen atom.

In the formula (VI), X represents an oxygen atom (—O—) or imino group (—NH—). Preferably, X represents an oxygen atom. In the formula (VI) or (VII), L represents a divalent connecting group. It is preferred that L represents a divalent aliphatic group (for example, an alkylene group, a substituted alkylene group, an alkenylene group, a substituted alkenylene group, an alkinylene group or a substituted alkinylene group), a divalent aromatic group (for example, an arylene group or a substituted arylene group), a divalent heterocyclic group or a combination of each of the groups described above with an oxygen atom (—O—), a sulfur atom (—S—), an imino group (—NH—), a substituted imino group (—NR—, wherein R represents an aliphatic group, an aromatic group or a heterocyclic group) or a carbonyl group (—CO—).

The aliphatic group may form a cyclic structure or a branched structure. The number of carbon atoms of the aliphatic group is preferably from 1 to 20, more preferably from 1 to 15, and most preferably from 1 to 10. It is preferred that the aliphatic group is a saturated aliphatic group rather than an unsaturated aliphatic group. The aliphatic group may have a substituent. Examples of the substituent include a halogen atom, a hydroxy group, an aromatic group and a heterocyclic group.

The number of carbon atoms of the aromatic group is preferably from 6 to 20, more preferably from 6 to 15 and most preferably from 6 to 10. The aromatic group may have a substituent. Examples of the substituent include a halogen atom, a hydroxy group, an aliphatic group, an aromatic group and a heterocyclic group.

It is preferred that the heterocyclic group has a 5-membered or 6-membered ring as the hetero ring. Other heterocyclic ring, an aliphatic ring or an aromatic ring may be condensed to the heterocyclic ring. The heterocyclic group may have a substituent. Examples of the substituent include a halogen atom, a hydroxy group, an oxo group (=O), a thioxo group (=S), an imino group (=NH), a substituted imino group (=N—R, where R represents an aliphatic group, an aromatic group or a heterocyclic group), an aliphatic group, an aromatic group and a heterocyclic group.

It is preferred that L represents a divalent connecting group containing a plurality of polyoxyalkylene structures. It is more preferred that the polyoxyalkylene structure is a polyoxyethylene structure. Specifically, it is preferred that L contains —(OCH₂CH₂)ₙ— (n is an integer of 2 or more).

In the formula (VI) or (VII), Z represents a functional group adsorbing to the hydrophilic surface of the support. In the formula (VII), Y represents a carbon atom or a nitrogen atom. In the case where Y is a nitrogen atom and L is connected to Y to form a quaternary pyridinium group, Z is not mandatory, because the quaternary pyridinium group itself exhibits the adsorptivity.

The adsorptive functional group is the same as that described above.

Representative examples of the monomer represented by formula (VI) or (VII) are set forth below.

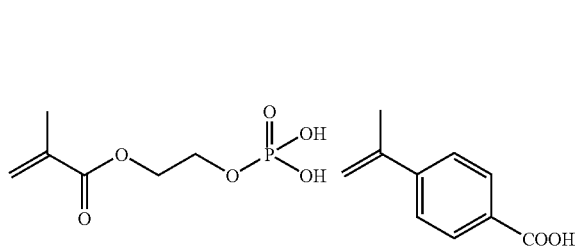

-continued

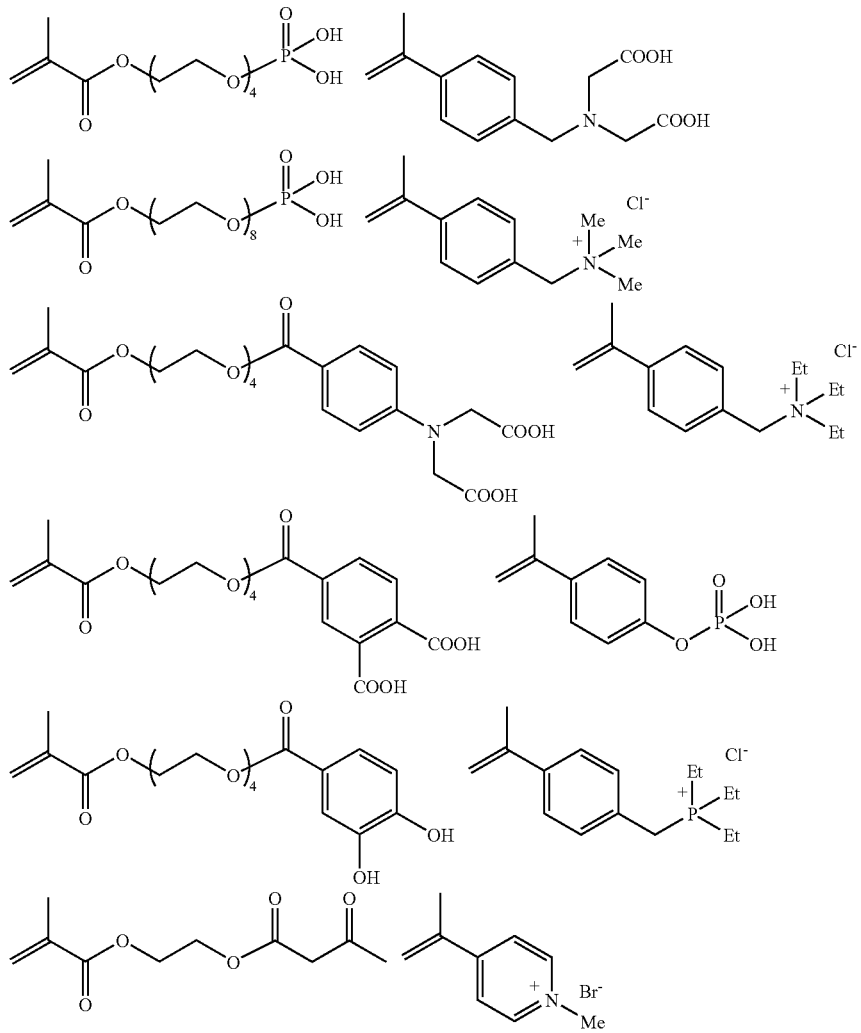

The hydrophilic group of the polymer resin for undercoat layer which can be used in the invention includes, for example, a hydroxy group, a carboxyl group, a carboxylate group, a hydroxyethyl group, a polyoxyethyl group, a hydroxypropyl group, a polyoxypropyl group, an amino group, an aminoethyl group, an aminopropyl group, an ammonium group, an amido group, a carboxymethyl group, a sulfonic acid group and a phosphoric acid group. A monomer containing such a hydrophilic group and a polymerizable group is employed as a copolymerization component of the polymer resin for undercoat layer.

The polymer resin for undercoat layer which can be used in the invention preferably includes a crosslinkable group. By the crosslinkable group, increase in adhesion to the image area can be achieved. In order to impart the crosslinkable property to the polymer resin for the undercoat layer, introduction of a crosslinkable functional group, for example, an ethylenically unsaturated bond into the side chain of the polymer resin, or introduction by formation of a salt structure between a polar substituent of the polymer resin and a compound containing a substituent having a counter charge to the polar substituent of the polymer resin and an ethylenically unsaturated bond is carried out.

Examples of the polymer having an ethylenically unsaturated bond in the side chain thereof include a polymer of an ester or amide of acrylic acid or methacrylic acid, which is a polymer wherein the ester or amide residue (R in —COOR or —CONHR) has an ethylenically unsaturated bond.

Examples of the residue (R described above) having an ethylenically unsaturated bond include —$(CH_2)_n CR_1$=$CR_2 R_3$, —$(CH_2O)_n CH_2 CR_1$=$CR_2 R_3$, —$(CH_2CH_2O)_n CH_2 CR_1$=$CR_2 R_3$, —$(CH_2)_n NH$—CO—O—$CH_2 CR_1$=$CCR_2 R_3$, —$(CH_2)_n$—O—CO—$CR_1$=$CCR_2 R_3$ and —$(CH_2CH_2O)_2$—X (wherein $R_1$ to $R_3$ each independently represents a hydrogen atom, a halogen atom or an alkyl group having from 1 to 20 carbon atoms, an aryl group, alkoxy group or aryloxy group, or $R_1$ and $R_2$ or $R_1$ and $R_3$ may be combined with each other to form a ring. n represents an integer of 1 to 10. X represents a dicyclopentadienyl residue).

Specific examples of the ester residue include —$CH_2CH$=$CH_2$ (described in JP-B-7-21633) —$CH_2CH_2O$—$CH_2CH$=$CH_2$, —$CH_2C(CH_3)$=$CH_2$, —$CH_2CH$=$CH$—$C_6H_5$, —$CH_2CH_2OCOCH$=$CH$—$C_6H_5$, —CH$_2$CH$_2$—NHCOO—CH$_2$CH=CH$_2$ and —CH$_2$CH$_2$O—X (wherein X represents a dicyclopentadienyl residue).

Specific examples of the amide residue include —CH$_2$CH=CH$_2$, —CH$_2$CH$_2$O—Y (wherein Y represents a cyclohexene residue) and —CH$_2$CH$_2$—OCO—CH=CH$_2$.

As the monomer having a crosslinkable group for the polymer resin for the undercoat layer, an ester or amide of acrylic acid or methacrylic acid having the above-described crosslinkable group is preferable.

A content of the crosslinking group in the polymer resin for undercoat layer (content of the radical polymerizable unsaturated double bond determined by iodine titration) is preferably from 0.1 to 10.0 mmol, more preferably from 1.0 to 7.0 mmol and most preferably from 2.0 to 5.5 mmol, based on 1 g of the polymer resin. In the above-described range, preferable compatibility between the sensitivity and stain resistance and good preservation stability can be achieved.

A weight average molecular weight of the polymer resin for undercoat layer is preferably 5,000 or more, more preferably from 10,000 to 300,000. A number average molecular weight of the polymer resin for undercoat layer is preferably 1,000 or more, more preferably from 2,000 to 250,000. The polydispersity (weight average molecular weight/number average molecular weight) thereof is preferably from 1.1 to 10.

The polymer resin for undercoat layer may be any of a random polymer, a block polymer and a graft polymer, and it is preferably a random polymer.

As the polymer resin for undercoat layer, known resins having a hydrophilic group can also be used. Specific examples of the resin include gum arabic, casein, gelatin, a starch derivative, carboxy methyl cellulose and a sodium salt thereof, cellulose acetate, sodium alginate, vinyl acetate-maleic acid copolymer, styrene-maleic acid copolymer, polyacrylic acid and a salt thereof, polymethacrylic acid and a salt thereof, a homopolymer or copolymer of hydroxyethyl methacrylate, a homopolymer or copolymer of hydroxyethyl acrylate, a homopolymer or copolymer of hydroxypropyl methacrylate, a homopolymer or copolymer of hydroxypropyl acrylate, a homopolymer or copolymer of hydroxybutyl methacrylate, a homopolymer or copolymer of hydroxybutyl acrylate, a polyethylene glycol, a hydroxypropylene polymer, a polyvinyl alcohol, a hydrolyzed polyvinyl acetate having a hydrolysis degree of 60% by mole or more, preferably 80% by mole or more, a polyvinyl formal, a polyvinyl butyral, a polyvinyl pyrrolidone, a homopolymer or copolymer of acrylamide, a homopolymer or polymer of methacrylamide, a homopolymer or copolymer of N-methylolacrylamide, a polyvinyl pyrrolidone, an alcohol-soluble nylon, a polyether of 2,2-bis-(4-hydroxyphenyl)propane and epichlorohydrin.

The polymer resins for undercoat layer may be used individually or in a mixture of two or more thereof.

A coating amount (solid content) of the undercoat layer is preferably from 0.1 to 100 mg/m$^2$, and more preferably from 1 to 30 mg/m$^2$.

[Protective Layer]

In the lithographic printing plate precursor according to the invention, a protective layer (overcoat layer) can be provided on the image-recording layer, if desired, for the purpose of imparting an oxygen blocking property, preventing occurrence of scratch or the like in the image-recording layer, preventing ablation caused by exposure with a high illuminance laser beam or the like.

Ordinarily, the exposure process of a lithographic printing plate precursor is performed in the air. The image-forming reaction occurred upon the exposure process in the image-recording layer may be inhibited by a low molecular compound, for example, oxygen or a basic substance present in the air. The protective layer prevents the low molecular compound, for example, oxygen or a basic substance from penetrating into the image-recording layer and as a result, the inhibition of image-forming reaction at the exposure process in the air can be avoided. Accordingly, the property required of the protective layer is to reduce permeability of the low molecular compound, for example, oxygen. Further, the protective layer preferably has good transparency to light used for the exposure, is excellent in adhesion to the image-recording layer, and can be easily removed during the on-machine development processing step after the exposure. With respect to the protective layer having such properties, there are described, for example, in U.S. Pat. No. 3,458,311 and JP-B-55-49729.

As a material for use in the protective layer, any water-soluble polymer and water-insoluble polymer can be appropriately selected to use. Specifically, a water-soluble polymer, for example, polyvinyl alcohol, modified polyvinyl alcohol, polyvinyl pyrrolidone, polyvinyl imidazole, polyacrylic acid, polyacrylamide, partially saponified product of polyvinyl acetate, ethylene-vinyl alcohol copolymer, water-soluble cellulose derivative, gelatin, starch derivative or gum arabic, and a polymer, for example, polyvinylidene chloride, poly(meth)acrylonitrile, polysulfone, polyvinyl chloride, polyethylene, polycarbonate, polystyrene, polyamide or cellophane are exemplified. The polymers may be used in combination of two or more thereof, if desired.

As a relatively useful material for use in the protective layer, a water-soluble polymer compound excellent in crystallinity is exemplified. Specifically, polyvinyl alcohol, polyvinyl pyrrolidone, polyvinyl imidazole, a water-soluble acrylic resin, for example, polyacrylic acid, gelatin or gum arabic is preferably used. Above all, polyvinyl alcohol, polyvinyl pyrrolidone and polyvinyl imidazole are more preferably used from the standpoint of capability of coating with water as a solvent and easiness of removal with dampening water at printing. Among them, polyvinyl alcohol (PVA) provides most preferable results on the fundamental properties, for example, oxygen blocking property or removability with development.

The polyvinyl alcohol for use in the protective layer according to the invention may be partially substituted with ester, ether or acetal as long as it contains a substantial amount of unsubstituted vinyl alcohol units necessary for maintaining water solubility. Also, the polyvinyl alcohol may partially contain other copolymerization components. For instance, polyvinyl alcohols of various polymerization degrees having at random a various kind of hydrophilic modified cites, for example, an anion-modified cite modified with an anion, e.g., a carboxy group or a sulfo group, a cation-modified cite modified with a cation, e.g., an amino group or an ammonium group, a silanol-modified cite or a thiol-modified cite, and polyvinyl alcohols of various polymerization degrees having at the terminal of the polymer having a various kind of modified cites, for example, the above-described anion-modified cite, cation modified cite, silanol-modified cite or thiol-modified cite, an alkoxy-modified cite, a sulfide-modified cite, an ester modified cite of vinyl alcohol with a various kind of organic acids, an ester modified cite of the above-described anion-modified cite with an alcohol or an epoxy-modified cite are also preferably used.

Preferable examples of the polyvinyl alcohol include those having a hydrolysis degree of 71 to 100% by mole and a polymerization degree of 300 to 2,400. Specific examples of the polyvinyl alcohol include PVA-105, PVA-110, PVA-117, PVA-117H, PVA-120, PVA-124, PVA-124H, PVA-CS, PVA-CST, PVA-HC, PVA-203, PVA-204, PVA-205, PVA-210, PVA-217, PVA-220, PVA-224, PVA-217EE, PVA-217E, PVA-220E, PVA-224E, PVA-405, PVA-420, PVA-613 and L-8 all produced by Kuraray Co., Ltd. Specific examples of the modified polyvinyl alcohol include that having an anion-modified cite, for example, KL-318, KL-118, KM-618, KM-118 or SK-5102, that having a cation-modified cite, for example, C-318, C-118 or CM-318, that having a terminal thiol-modified cite, for example, M-205 or M-115, that having a terminal sulfide-modified cite, for example, MP-103, MP-203, MP-102 or MP-202, that having an ester-modified cite with a higher fatty acid at the terminal, for example, HL-12E or HL-1203 and that having a reactive silane-modified cite, for example, R-1130, R-2105 or R-2130.

It is also preferable that the protective layer contains a stratiform compound. The stratiform compound is a particle having a thin tabular shape and includes, for instance, mica, for example, natural mica represented by the following formula: $A (B, C)_{2-5} D_4 O_{10} (OH, F, O)_2$, (wherein A represents any one of K, Na and Ca, B and C each represents any one of Fe (II), Fe(III), Mn, Al, Mg and V, and D represents Si or Al) or synthetic mica; talc represented by the following formula: $3MgO.4SiO.H_2O$; teniolite; montmorillonite; saponite; hectolite; and zirconium phosphate.

Examples of the natural mica include muscovite, paragonite, phlogopite, biotite and lepidolite. Examples of the synthetic mica include non-swellable mica, for example, fluorphlogopite $KMg_3(AlSi_3O_{10})F_2$ or potassium tetrasilic mica $KMg_{2.5}(Si_4O_{10})F_2$, and swellable mica, for example, Na tetrasilic mica $NaMg_{2.5}(Si_4O_{10})F_2$, Na or Li teniolite $(Na, Li)Mg_2Li(Si_4O_{10})F_2$, or montmorillonite based Na or Li hectolite $(Na, Li)_{1/8}Mg_{2/5}Li_{1/8}(Si_4O_{10})F_2$. Synthetic smectite is also useful.

Of the stratiform compounds, fluorine-based swellable mica, which is a synthetic stratiform compound, is particularly useful in the invention. Specifically, the swellable synthetic mica and an swellable clay mineral, for example, montmorillonite, saponite, hectolite or bentonite have a stratiform structure comprising a unit crystal lattice layer having thickness of approximately 10 to 15 angstroms, and metallic atom substitution in the lattices thereof is remarkably large in comparison with other clay minerals. As a result, the lattice layer results in lack of positive charge and to compensate it, a cation, for example, $Li^+$, $Na^+$, $Ca^{2+}$, $Mg^{2+}$ or an organic cation, e.g., an amine salt, a quaternary ammonium salt, a phosphonium salt or a sulfonium salt is adsorbed between the lattice layers. The stratiform compound greatly swells upon contact with water. When share is applied under such condition, the stratiform crystal lattices are easily cleaved to form a stable sol in water. The bentnite and swellable synthetic mica have strongly such tendency.

With respect to the shape of the stratiform compound, the thinner the thickness or the larger the plain size as long as smoothness of coated surface and transmission of actinic radiation are not damaged, the better from the standpoint of control of diffusion. Therefore, an aspect ratio of the stratiform compound is ordinarily 20 or more, preferably 100 or more, and particularly preferably 200 or more. The aspect ratio is a ratio of thickness to major axis of particle and can be determined, for example, from a projection drawing of particle by a microphotography. The larger the aspect ratio, the greater the effect obtained.

As for the particle diameter of the stratiform compound, an average diameter is ordinarily from 1 to 20 µm, preferably from 1 to 10 µm, and particularly preferably from 2 to 5 µm.

When the particle diameter is less than 1 µm, the inhibition of permeation of oxygen or moisture is insufficient and the effect of the stratiform compound can not be satisfactorily achieved. On the other hand, when it is larger than 20 µm, the dispersion stability of the particle in the coating solution is insufficient to cause a problem in that stable coating can not be performed. An average thickness of the particle is ordinarily 0.1 µm or less, preferably 0.05 µm or less, and particularly preferably 0.01 µm or less. For example, with respect to the swellable synthetic mica that is the representative compound of the stratiform compounds, the thickness is approximately from 1 to 50 nm and the plain size is approximately from 1 to 20 µm.

When such a stratiform compound particle having a large aspect ratio is incorporated into the protective layer, strength of the coated layer increases and penetration of oxygen or moisture can be effectively inhibited so that the protective layer can be prevented from deterioration due to deformation, and even when the lithographic printing plate precursor is preserved for a long period of time under a high humidity condition, it is prevented from decrease in the image-forming property thereof due to the change of humidity and exhibits excellent preservation stability.

An amount of the stratiform compound contained in the protective layer is ordinarily from 5/1 to 1/100 in terms of a weight ratio of the stratiform compound to an amount of a binder used in the protective layer. When a plural kind of the stratiform compounds is used together, it is preferred that the total amount of the stratiform compounds is in the range of weight ratio described above.

As other composition for the protective layer, glycerol, dipropylene glycol or the like can be added in an amount corresponding to several % by weight of the (co)polymer to impart flexibility. Further, an anionic surfactant, for example, sodium alkyl sulfate or sodium alkyl sulfonate; an amphoteric surfactant, for example, alkylamino carboxylic acid salt or alkylamino dicarboxylic acid salt; or a non-ionic surfactant, for example, polyoxyethylene alkyl phenyl ether can be added. An amount of the surfactant added is from 0.1 to 100% by weight of the (co)polymer.

Further, for the purpose of improving the adhesion to the image-recording layer, for example, it is described in JP-A-49-70702 that sufficient adhesion can be obtained by mixing from 20 to 60% by weight of an acrylic emulsion, a water-insoluble vinyl pyrrolidone-vinyl acetate copolymer or the like in a hydrophilic polymer mainly comprising polyvinyl alcohol and coating the mixture on the image-recording layer. In the invention, any of such known techniques can be used.

Further, other functions can also be provided to the protective layer. For instance, by adding a coloring agent (for example, a water-soluble dye), which is excellent in permeability for infrared ray used for the exposure and capable of efficiently absorbing light at other wavelengths, a safe light adaptability can be improved without causing decrease in the sensitivity.

An example of common dispersing method for the stratiform compound used in the protective layer is described below. Specifically, from 5 to 10 parts by weight of a swellable stratiform compound that is exemplified as a preferred stratiform compound is added to 100 parts by weight of water to adapt the compound to water and to be swollen, followed by dispersing using a dispersing machine. The dispersing machine used include, for example, a variety of mills conducting dispersion by directly applying mechanical power, a high-speed agitation type dispersing machine providing a large shear force and a dispersion machine providing ultrasonic energy of high intensity. Specific examples thereof include a ball mill, a sand a grinder mill, a visco mill, a colloid mill, a homogenizer, a dissolver, a polytron, a homomixer, a homoblender, a keddy mill, a jet agitor, a capillary type emulsifying device, a liquid siren, an electromagnetic strain type ultrasonic generator and an emulsifying device having Polman whistle. A dispersion containing from 5 to 10% by weight of the stratiform compound thus prepared is highly viscous or gelled and exhibits extremely good preservation stability. In the formation of a coating solution for protective layer using the dispersion, it is preferred that the dispersion is diluted with water, sufficiently stirred and then mixed with a binder solution.

To the coating solution for protective layer can be added known additives, for example, an anionic surfactant, a nonionic surfactant, a cationic surfactant or a fluorine-based surfactant for improving coating property or a water-soluble plasticizer for improving physical property of the coated layer. Examples of the water-soluble plasticizer include propionamide, cyclohexanediol, glycerin or sorbitol. Also, a water-soluble (meth)acrylic polymer can be added. Further, to the coating solution may be added known additives for increasing adhesion to the image-recording layer or for improving time-lapse stability of the coating solution.

The coating solution for protective layer thus-prepared is coated on the image-recording layer provided on the support and then dried to form a protective layer. The coating solvent may be appropriately selected in view of the binder used, and when a water-soluble polymer is used, distilled water or purified water is preferably used as the solvent. A coating method of the protective layer is not particularly limited, and known methods, for example, methods described in U.S. Pat. No. 3,458,311 and JP-B-55-49729 can be utilized. Specific examples of the coating method for the protective layer include a blade coating method, an air knife coating method, a gravure coating method, a roll coating method, a spray coating method, a dip coating method and a bar coating method.

A coating amount of the protective layer is preferably in a range from 0.01 to 10 $g/m^2$, more preferably in a range from 0.02 to 3 $g/m^2$, and most preferably in a range from 0.02 to 1 $g/m^2$ in terms of the coating amount after drying.

[Lithographic Printing Method]

As a light source for exposure of the lithographic printing plate precursor according to the invention, known light sources can be used without limitation. A preferred wavelength of the light source is from 300 to 1,200 nm. Specifically, various kinds of lasers preferably used as the light source, and among them, a semiconductor laser emitting an infrared ray having a wavelength of 760 to 1,200 nm is preferably used.

The exposure mechanism used may be any of inner surface drum type, outer surface drum type and flat bed type can be used.

Further, other exposure light sources used for the lithographic printing plate precursor according to the invention include, for example, a super-high pressure, high pressure, medium pressure or low pressure mercury lamp, a chemical lamp, a carbon arc lamp, a xenon lamp, a metal halide lamp, a variety of visible or ultraviolet laser lamps, a fluorescent lamp, a tungsten lamp and sunlight.

In the lithographic printing method according to the invention, the lithographic printing plate precursor of the invention is exposed imagewise by an infrared laser and then without undergoing the development processing step, to the lithographic printing plate precursor are supplied oily ink and an aqueous component to perform printing.

More specifically, there are illustrated a method wherein the lithographic printing plate precursor is exposed by an infrared laser and without undergoing the development processing step, mounted on a printing machine to perform printing and a method wherein the lithographic printing plate precursor is mounted on a printing machine, exposed by an infrared laser on the printing machine to perform printing without undergoing the development processing step.

After the imagewise exposure of the lithographic printing plate precursor by an infrared laser, when an aqueous component and oily ink are supplied to perform printing without undergoing the development processing step, for example, a wet development processing step, in the exposed area of the image-recording layer, the image-recording layer hardened by the exposure forms the oily ink receptive area having an oleophilic surface. On the other hand, in the unexposed area, the unhardened image-recording layer is removed by dissolution or dispersion with the aqueous component and/or oily ink supplied to reveal a hydrophilic surface of support in the area.

As a result, the aqueous component is adhered on the revealed hydrophilic surface, the oily ink is adhered to the exposed area of the image-recording layer, and thus printing is initiated. While either the aqueous component or the oily ink may be supplied at first to the plate surface, it is preferred to supply the oily ink at first in view of preventing the aqueous component from contamination with the image-recording layer in the unexposed area. For the aqueous component and oily ink, dampening water and printing ink for conventional lithographic printing are used respectively.

Thus, the lithographic printing plate precursor is subjected to the on-machine development on an offset printing machine and used as it is for printing a large number of sheets.

EXAMPLES

The present invention will be described in more detail with reference to the following examples, but the invention should not be construed as being limited thereto.

[Synthesis of Infrared Absorbing Agent (1)]

A mixture of 20.0 g of 3-(1-naphthyl)ethyl tosylate and 9.5 g of 2,3,3,5-tetramethyl-3H-indole was stirred at 120° C. for 2 hours and allowed to cool to room temperature. Then, 12.2 g of 2,5-bis [(phenylamino)methylene]cyclopentylidene-diphenylaminium tetrafluoroborate, 9.4 g of acetic anhydride, 9.4 g of triethylamine and 50 ml of 2-propanol were added thereto and the mixture was stirred 80° C. for 2 hours. After being allowed to cool to room temperature, the crystals deposited were collected by filtration and thoroughly washed with water to obtain 8.5 g (yield 37%) of Infrared Absorbing Agent (1).

Electron absorption spectrum (MeOH): absorption maximum wavelength: 816 nm; absorption maximum molar extinction coefficient: 249,000

$^1$H-NMR (400 MHz, DMSO-d6): δ 8.18 (d, J=8.4 Hz, 2H), 8.02 (d, J=8.4 Hz, 2H), 7.83 (d, J=8.4 Hz, 2H), 7.63 (m, 4H), 7.39 (t, J=8.0 Hz, 4H), 7.27 (t, J=8.0 Hz, 2H), 7.19-6.96 (m, 20H), 5.07 (d, J=14.0 Hz, 2H), 4.37 (t, J=4.4 Hz, 4H), 3.50 (t, J=4.4 Hz, 4H), 2.31 (s, 6H), 2.00 (s, 4H), 0.90 (s, 12H).

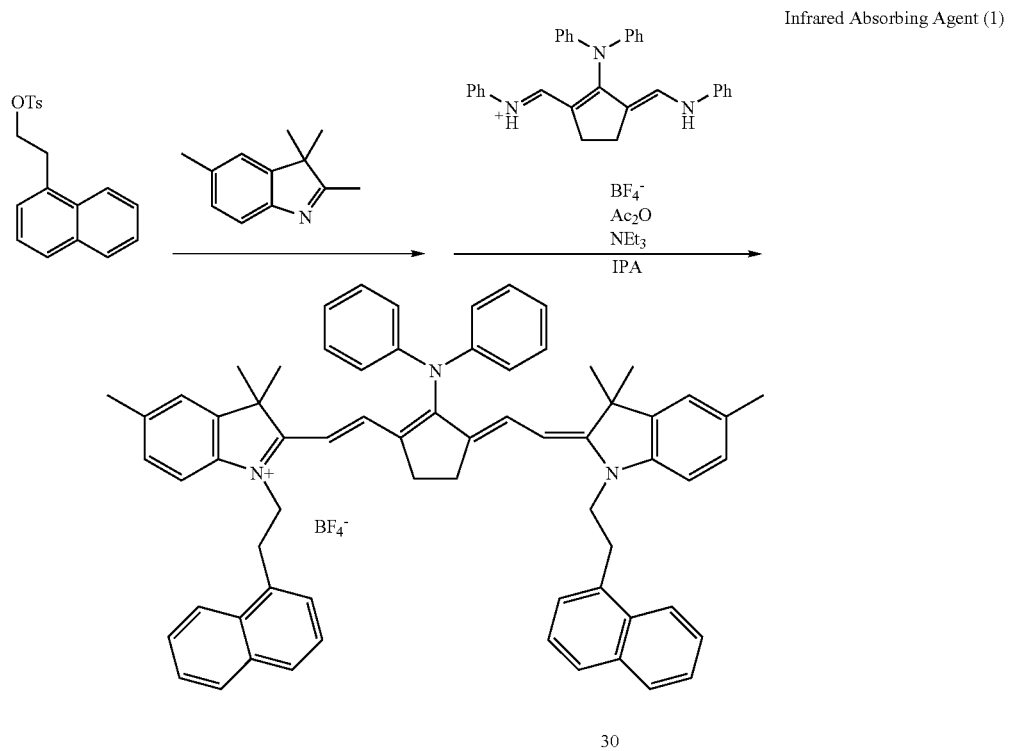

Infrared Absorbing Agent (1)

[Synthesis of Infrared Absorbing Agent (4)]

A mixture of 10.00 g of 2-(N-carbazolyl)ethyl tosylate and 4.70 g of 2,3,3,5-tetramethyl-3H-indole was stirred at 120° C. for 4 hours and allowed to cool to room temperature. Then, 5.80 g of 2,5-bis [(phenylamino)methylene]cyclopentyl-idenediphenylaminium tetrafluoroborate, 5.60 g of acetic anhydride, 5.60 g of triethylamine and 30 ml of 2-propanol were added thereto and the mixture was stirred 80° C. for 1 hour. After being allowed to cool to room temperature, the crystals deposited were collected by filtration and thoroughly washed with water to obtain 5.89 g (yield 50%) of Infrared Absorbing Agent (4).

Electron absorption spectrum (MeOH): absorption maximum wavelength: 814 nm; absorption maximum molar extinction coefficient: 280,000

$^1$H-NMR (400 MHz, DMSO-d6): δ 8.13 (d, J=7.6 Hz, 4H), 7.35-7.18 (m, 20H), 7.17 (s, 2H), 7.08 (t, J=7.6 Hz, 2H), 6.80 (d, J=7.6 Hz, 4H), 6.69 (d, J=13.6 Hz, 2H), 4.82 (t, J=4.4 Hz, 4H), 4.78 (d, J=13.6 Hz, 2H), 4.51 (t, J=4.4 Hz, 4H), 2.31 (s, 6H), 1.56 (s, 4H), 0.50 (s, 12H).

Example 1

Preparation of Aluminum Support

An aluminum plate (material: JIS 1050) having a thickness of 0.3 mm was subjected to a degreasing treatment at 50° C. for 30 seconds using a 10% by weight aqueous sodium aluminate solution in order to remove rolling oil on the surface thereof and then grained the surface thereof using three nylon brushes embedded with bundles of nylon bristle having a diameter of 0.3 mm and an aqueous suspension (specific gravity: 1.1 g/cm$^3$) of pumice having a median size of 25 μm, followed by thorough washing with water. The plate was etched by immersing in a 25% by weight aqueous sodium hydroxide solution of 45° C. for 9 seconds, washed with water, then immersed in a 20% by weight aqueous nitric acid solution at 60° C. for 20 seconds, and washed with water. The etching amount of the grained surface was about 3 g/m$^2$.

Then, using an alternating current of 60 Hz, an electrochemical roughening treatment was continuously carried out on the plate. The electrolyte used was a 1% by weight aqueous nitric acid solution (containing 0.5% by weight of aluminum ion) and the electrolyte temperature was 50° C. The electrochemical roughening treatment was conducted using an alternating current source, which provides a rectangular alternating current having a trapezoidal waveform such that the time TP necessary for the current value to reach the peak from zero was 0.8 msec and the duty ratio was 1:1, and using a carbon electrode as a counter electrode. A ferrite was used as an auxiliary anode. The current density was 30 A/dm$^2$ in terms of the peak value of the electric current, and 5% of the electric current flowing from the electric source was divided to the auxiliary anode. The quantity of electricity in the nitric acid electrolysis was 175 C/dm$^2$ in terms of the quantity of electricity when the aluminum plate functioned as an anode. The plate was then washed with water by spraying.

The plate was further subjected to an electrochemical roughening treatment in the same manner as in the nitric acid electrolysis above using as an electrolyte, a 0.5% by weight aqueous hydrochloric acid solution (containing 0.5% by weight of aluminum ion) having temperature of 50° C. and under the condition that the quantity of electricity was 50 C/dm$^2$ in terms of the quantity of electricity when the aluminum plate functioned as an anode. The plate was then washed with water by spraying. The plate was subjected to an anodizing treatment using as an electrolyte, a 15% by weight aqueous sulfuric acid solution (containing 0.5% by weight of aluminum ion) at a current density of 15 A/dm$^2$ to form a direct current anodized film of 2.5 g/m$^2$, washed with water and dried. The plate was treated with a 2.5% by weight aqueous sodium silicate solution at 30° C. for 10 seconds. The center line average roughness (Ra) of the support was measured using a stylus having a diameter of 2 μm and it was found to be 0.51 μm.

Undercoat solution (1) shown below was coated on the aluminum plate described above so as to have a dry coating amount of 10 mg/m² to prepare a support for using in the experiments described below.

| Undercoat solution (1) | |
|---|---|
| Undercoat compound (1) shown below | 0.017 g |
| Methanol | 9.00 g |
| Water | 1.00 g |

Undercoat compound (1):

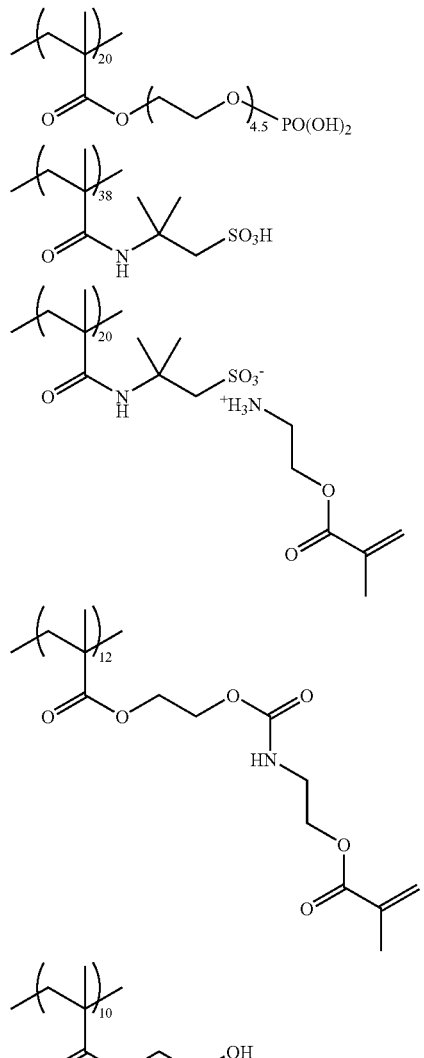

<Formation of Image-Recording Layer and Protective Layer>

Coating solution (1) for image-recording layer having the composition shown below was coated on the above-described support by a bar and dried in an oven at 100° C. for 60 seconds to form an image-recording layer having a dry coating amount of 1.0 g/m². Subsequently, Coating solution for protective layer having the composition shown below was coated on the image-recording layer by a bar and dried in an oven at 120° C. for 60 seconds to form a protective layer having a dry coating amount of 0.15 g/m², thereby preparing a lithographic printing plate precursor.

Coating solution (1) for image-recording layer was prepared by mixing Photosensitive solution (1) shown below with Microcapsule solution (1) shown below just before the coating, followed by stirring.

| Photosensitive solution (1) | |
|---|---|
| Binder polymer (1) shown below | 0.162 g |
| Polymerization initiator (1) shown below | 0.100 g |
| Infrared absorbing agent (1) shown below | 0.020 g |
| Polymerizable monomer | 0.385 g |
| (Aronics M-215, produced by Toagosei Co., Ltd.) | |
| Fluorine-based surfactant (1) shown below | 0.044 g |
| Methyl ethyl ketone | 1.091 g |
| Propylene glycol monomethyl ether | 8.609 g |
| Microcapsule solution (1) | |
| Microcapsule (1) prepared described below | 2.640 g |
| Water | 2.425 g |
| Coating solution for protective layer | |
| Dispersion of inorganic particle (1) shown below | 1.5 g |
| Polyvinyl alcohol | 0.06 g |
| (PVA-105, saponification degree: 98.5% by mole, polymerization degree: 500, produced by Kuraray Co., Ltd.) | |
| Polyvinylpyrrolidone | 0.01 g |
| (K30, molecular weight Mw: 40,000, produced by Tokyo Chemical Industry Co., Ltd.) | |
| Copolymer of vinylpyrrolidone and vinyl acetate | 0.01 g |
| (LUVITEC VA64W, copolymerization ratio = 6/4, produced by ISP Co., Ltd.) | |
| Nonionic surfactant | 0.01 g |
| (EMALEX 710, produced by Nihon-Emulsion Co., Ltd.) | |
| Ion-exchanged water | 6.0 g |

Binder polymer (1):

Polymerization initiator (1):

Infrared absorbing agent (1):

-continued

Fluorine-based surfactant (1):

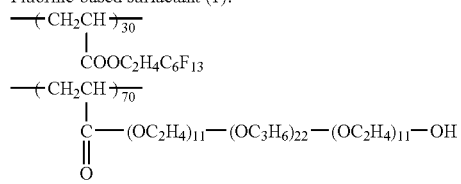

Preparation of Microcapsule (1)

An oil phase component was prepared by dissolving 10 g of adduct of trimethylol propane and xylene diisocyanate (Takenate D-110N, produced by Mitsui Takeda Chemical Co., Ltd., 75% by weight ethyl acetate solution), 6.00 g of Aronix M-215 (produced by Toagosei Co., Ltd.) and 0.12 g of Pionine A-41C (produced by Takemoto Oil and Fat Co., Ltd.) in 16.67 g of ethyl acetate. As an aqueous phase component, 37.5 g of a 4% by weight aqueous solution of PVA-205 was prepared. The oil phase component and the aqueous phase component were mixed and emulsified using a homogenizer at 12,000 rpm for 10 minutes. The resulting emulsion was added to 25 g of distilled water and stirred at a room temperature for 30 minutes and then at 40° C. for 2 hours. The thus obtained microcapsule liquid was diluted using distilled water so as to have the solid concentration of 15% by weight to prepare Microcapsule (1). The average particle size of the particle in Microcapsule (1) was 0.2 μm.

Preparation of Dispersion of Inorganic Particle (1)

To 193.6 g of ion-exchanged water was added 6.4 g of synthetic mica (Somasif ME-100, produced by CO-OP Chemical Co., Ltd.) and the mixture was dispersed using a homogenizer until an average particle size (according to a laser scattering method) became 3 μm to prepare Dispersion of inorganic particle (1). An aspect ratio of the inorganic particle thus-dispersed was 100 or more.

Examples 2 to 4

Lithographic printing plate precursors were prepared in the same manner as in Example 1 except for changing Infrared absorbing agent (1) used in Example 1 to Infrared absorbing agents (2) to (4) shown below, respectively.

Infrared absorbing agent (2):

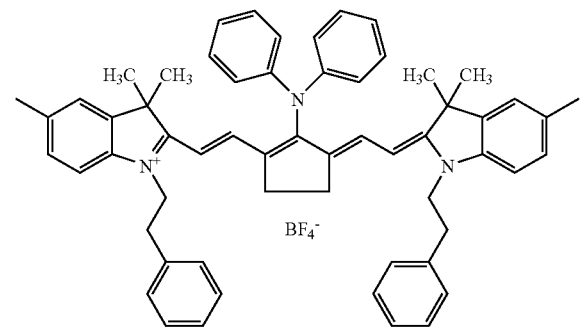

-continued

Infrared absorbing agent (3):

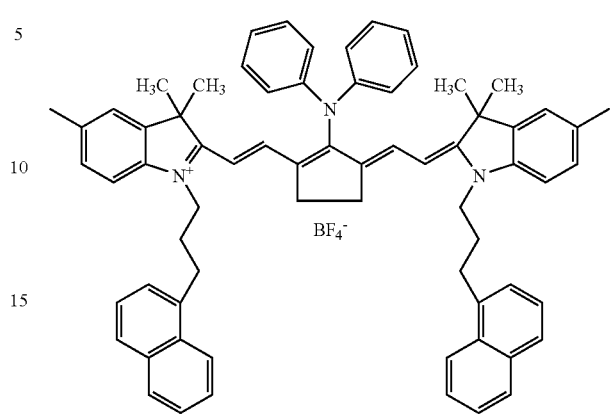

Infrared absorbing agent (4):

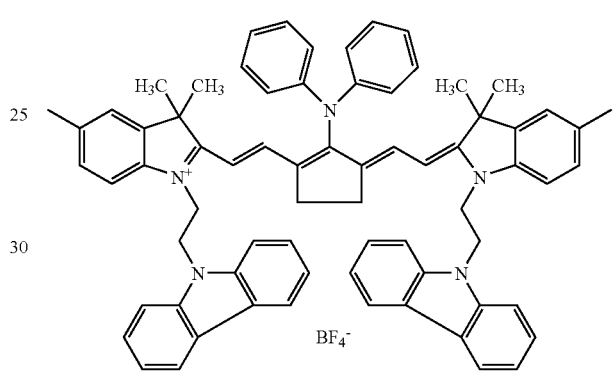

Example 5

Coating solution (2) for image-recording layer having the composition shown below was coated on the above-described support by a bar and dried in an oven at 100° C. for 60 seconds to form an image-recording layer having a dry coating amount of 1.0 g/m² to prepare a lithographic printing plate precursor.

| Coating solution (2) for image-recording layer | |
|---|---|
| Infrared absorbing agent (1) shown above | 0.05 g |
| Polymerization initiator (1) shown above | 0.20 g |
| Binder polymer (2) shown below | 0.50 g |
| (average molecular weight: 80,000) | |
| Polymerizable monomer | 1.00 g |
| (Aronics M-215, produced by Toa Gosei Co., Ltd.) | |
| Naphthalenesulfonate salt of Victoria Pure Blue | 0.02 g |
| Fluorine-based surfactant (1) shown above | 0.10 g |
| Methyl ethyl ketone | 18.0 g |

Binder polymer (2):

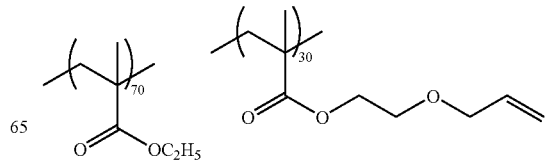

Examples 6 to 8

Lithographic printing plate precursors were prepared in the same manner as in Example 5 except for changing Infrared absorbing agent (1) used in Example 5 to Infrared absorbing agents (2) to (4) shown above, respectively.

Comparative Example 1

A lithographic printing plate precursor was prepared in the same manner as in Example 1 except for changing Infrared absorbing agent (1) used in Example 1 to Infrared absorbing agent (5) shown below. Infrared absorbing agent (5):

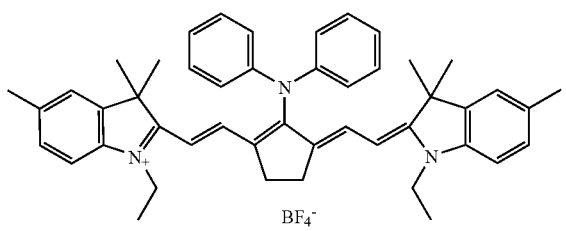

Comparative Example 2

A lithographic printing plate precursor was prepared in the same manner as in Example 5 except for changing Infrared absorbing agent (1) used in Example 5 to Infrared absorbing agent (5) shown above.

[Evaluation of Lithographic Printing Plate Precursor]

1. Measurement of Brightness Difference ΔL Between Exposed Area and Unexposed Area (Evaluation of Print-Out Image)

The lithographic printing plate precursor thus-obtained was exposed by Trendsetter 3244VX, produced by Creo Co., equipped with a water-cooled 40 W infrared semiconductor laser in an exposure energy amount on plate surface shown in Table 1 below under the condition of resolution of 2,400 dpi.

In order to evaluate the print-out image, L* values of the exposed area and unexposed area were measured using a colorimeter (Chroma Colorimeter CR-221, produced by Minolta Corp.) and from an absolute value of the difference of the L* values, brightness difference ΔL was determined.

The results are shown in Table 1 using an index taking the ΔL value of Example 1 as standard (100). As a numeral of the ΔL index is larger, the visibility is better and more preferable.

2. Evaluations of on-Machine Development Property and Printing

The exposed lithographic printing plate precursor was mounted on a plate cylinder of a printing machine (SOR-M, produced by Heidelberg Co.) without conducting development processing. After supplying dampening water [EU-3 (etching solution, produced by Fuji Photo Film Co., Ltd.)/water/isopropyl alcohol=1/89/10 (volume ratio)] and ink (TRANS-G (N) black ink, produced by Dainippon Ink and Chemicals, Inc.), 100 sheets of printing was conducted at a printing speed of 6,000 sheets per hour.

A number of printing papers required until removal (on-machine development) of the unexposed area of the image-recording layer on the printing machine was completed to reach a state where the ink was not transferred to the printing paper in the non-image area was determined to evaluate the on-machine development property. As a result, printed materials free from stain in the non-image area were obtained within the printing of 100 sheets in the case of using the lithographic printing plate precursors according to the invention.

Thereafter, printing of 5,000 sheets was further conducted and good printed materials without decrease in ink density in the image area and occurrence of stain in the non-image area were obtained.

TABLE 1

| | Exposure Energy (mJ/cm$^2$) | HOMO Energy Level of Substituent on Nitrogen Atom of Infrared Absorbing Agent | Brightness Difference ΔL |
|---|---|---|---|
| Example 1 | 100 | −8.6 eV | 100 |
| Example 2 | 100 | −9.3 eV | 90 |
| Example 3 | 100 | −8.5 eV | 80 |
| Example 4 | 100 | −8.2 eV | 100 |
| Example 5 | 100 | −8.6 eV | 120 |
| Example 6 | 100 | −9.3 eV | 100 |
| Example 7 | 100 | −8.5 eV | 90 |
| Example 8 | 100 | −8.2 eV | 100 |
| Comparative Example 1 | 100 | −11.8 eV | 35 |
| Comparative Example 2 | 100 | −11.8 eV | 40 |

It is apparent from the results shown in Table 1 that with the lithographic printing plate precursors according to the invention, the contrast between the exposed area and unexposed area is good and the fine lines and letters are well recognized.

Example 9

A lithographic printing plate precursor was prepared in the same manner as in Example 1 except for changing the infrared absorbing agent used in Photosensitive solution (1) of Example 1 to Infrared absorbing agent (6) shown below.

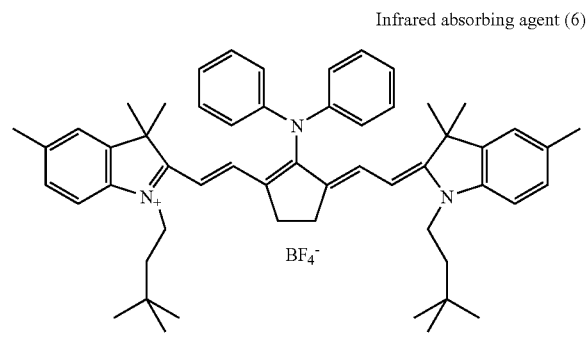

Infrared absorbing agent (6)

Examples 10 to 12

Lithographic printing plate precursors were prepared in the same manner as in Example 1 except for changing Infrared absorbing agent (1) used in Example 1 to Infrared absorbing agents (7) to (9) shown below, respectively.

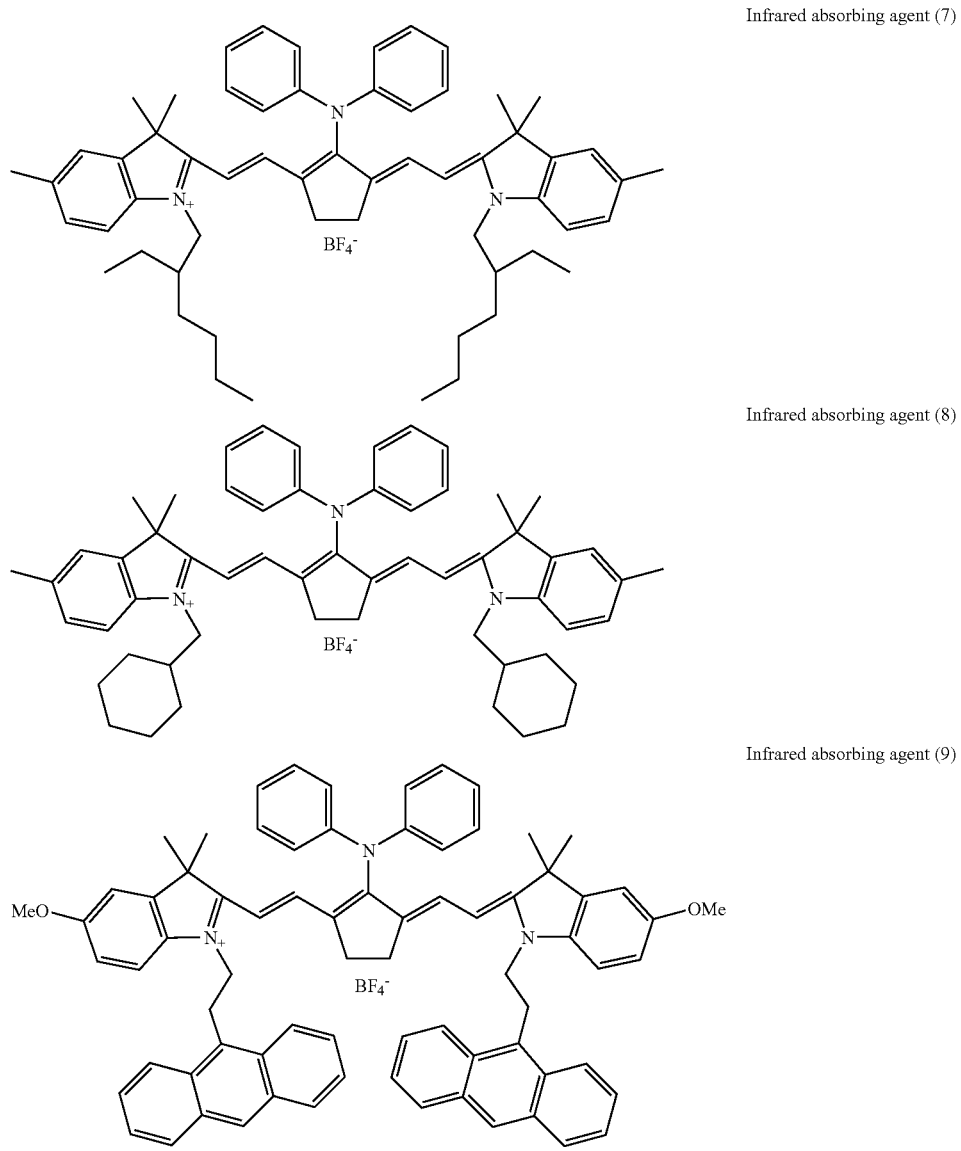

Infrared absorbing agent (7)

Infrared absorbing agent (8)

Infrared absorbing agent (9)

Examples 13 to 16

Lithographic printing plate precursors were prepared in the same manner as in Example 5 except for changing Infrared absorbing agent (1) used in Example 5 to Infrared absorbing agents (7) to (9) shown above, respectively.

[Evaluation of Lithographic Printing Plate Precursor]

The lithographic printing plate precursors obtained in Examples 9 to 16 were evaluated in the same manner as in Examples 1 to 8, respectively. The results obtained are shown in Table 2.

TABLE 2

|  | Exposure Energy (mJ/cm$^2$) | Brightness Difference ΔL |
| --- | --- | --- |
| Example 9 | 100 | 60 |
| Example 10 | 100 | 55 |
| Example 11 | 100 | 60 |
| Example 12 | 100 | 65 |
| Example 13 | 100 | 65 |
| Example 14 | 100 | 60 |
| Example 15 | 100 | 65 |
| Example 16 | 100 | 75 |

It is apparent from the results shown in Table 2 that with the lithographic printing plate precursors according to the invention, the contrast between the exposed area and unexposed area is good and the fine lines and letters are well recognized.

This application is based on Japanese Patent application JP 2005-280192, filed Sep. 27, 2005, and Japanese Patent application JP 2005-280242, filed Sep. 27, 2005, the entire contents of which are hereby incorporated by reference, the same as if set forth at length.

What is claimed is:

1. A lithographic printing plate precursor comprising a support and an image-recording layer containing at least one infrared absorbing agent of a cyanine dye in which a HOMO energy level of each of substituents present on both terminal nitrogen atoms is −9.0 eV or higher, wherein the infrared absorbing agent is represented by the following formula (II):

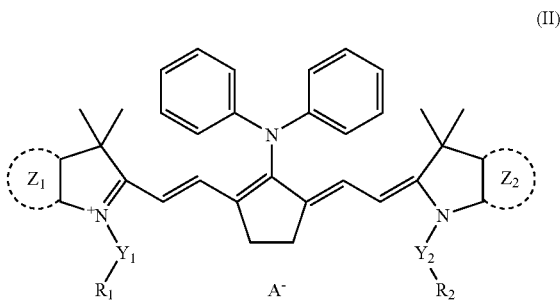

(II)

wherein $Y_1$ and $Y_2$ each independently represents an organic connecting group which has 1 or more atoms, contains a carbon atom and may have a substituent, or a single bond; $Z^1$ and $Z^2$ each independently represents an aromatic ring which may have a substituent or a hetero aromatic ring which may have a substituent; $R_1$ and $R_2$ each independently represents an organic functional group which meets a requirement that a HOMO energy level of $R_n$—$Y_n$—H, in which n is 1 or 2, is −9.0 eV or more; and $A^-$ represents a counter ion which exists in case of being necessary for neutralizing a charge;

wherein the image-recording layer further contains a polymerization initiator selected from the group consisting of an oxime ester, a diazonium salt, an iodonium salt, and a sulfonium salt, a polymerizable compound and a binder polymer.

2. The lithographic printing plate precursor as claimed in claim 1, wherein the image-recording layer further contains a microcapsule.

3. The lithographic printing plate precursor as claimed in claim 1, wherein the image-recording layer is capable of being image-recorded with infrared laser exposure and the lithographic printing plate precursor is capable of performing printing by conducting image-recording and then mounting on a printing machine without carrying out a development processing step or by conducting mounting on a printing machine and then image-recording.

4. The lithographic printing plate precursor as claimed in claim 1, wherein said substituents present on both terminal nitrogen atoms are each independently selected from the group consisting of 1-naphthylethyl group, a 9-anthracenylethyl group, an N-carbazolylethyl group, and an N-phenothiazinylethyl group.

5. The lithographic printing plate precursor as claimed in claim 1, wherein $Y_1$ and $Y_2$ of formula (II) each independently represents an organic connecting group having from 1 to 3 carbon atoms.

6. The lithographic printing plate precursor as claimed in claim 1, wherein the infrared absorbing agent is selected from the group consisting of the following compounds:

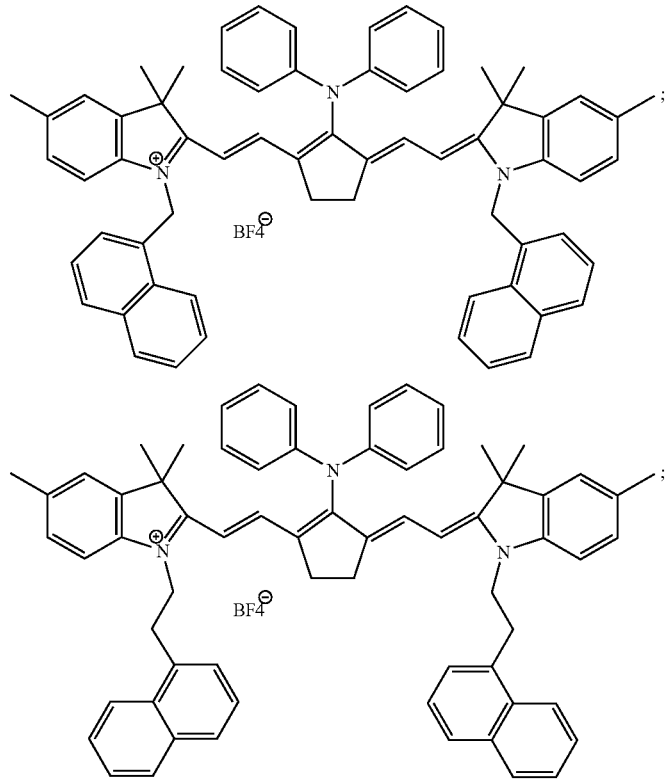

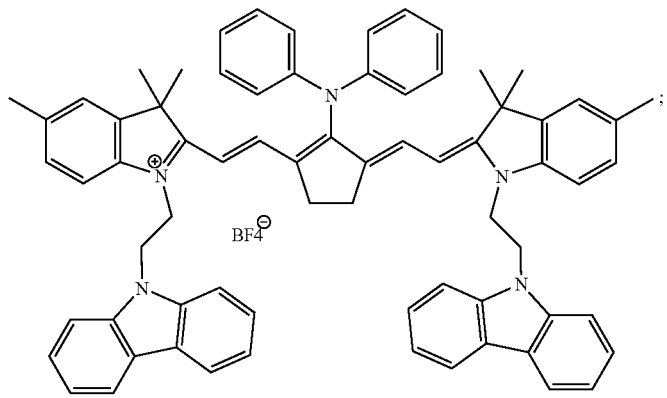
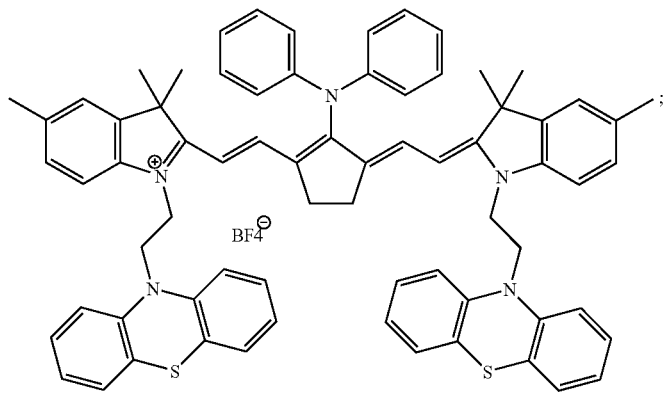
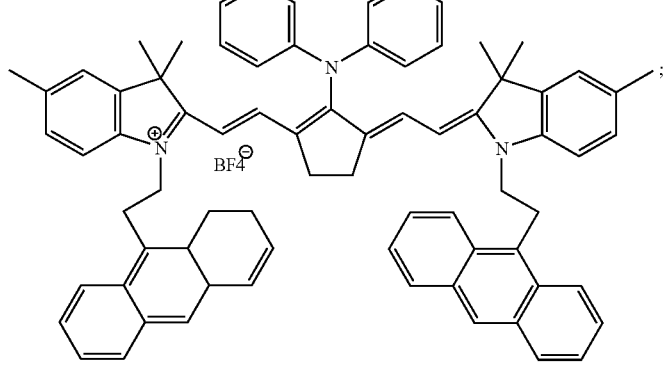
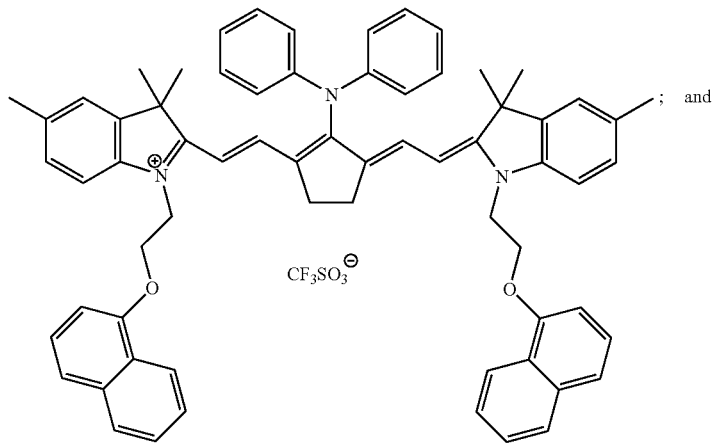

-continued

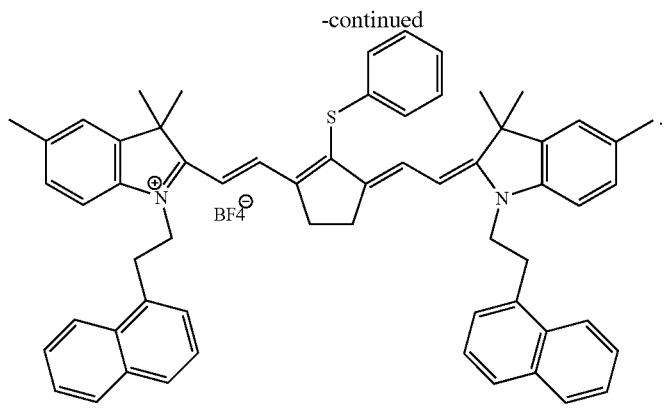

7. The lithographic printing plate precursor as claimed in claim 4, wherein said substituents present on both terminal nitrogen atoms are N-carbazolylethyl group.

8. A printing method comprising mounting the lithographic printing plate precursor as claimed in claim 1 on a printing machine and exposing imagewise the mounted lithographic printing plate precursor with an infrared laser or exposing imagewise the lithographic printing plate precursor as claimed in claim 2 with an infrared laser and mounting the exposed lithographic printing plate precursor on a printing machine, and thereafter conducting printing by supplying printing ink and dampening water on the exposed lithographic printing plate precursor to remove an unexposed area to the infrared laser in the image-recording layer.

9. The printing method according to claim 8, further comprising the step of:
discriminating an image made on the lithographic printing plate precursor after the step of exposing imagewise with an infrared laser and before the step of conducting printing by supplying printing ink and dampening water.

* * * * *